(12) United States Patent
Matsumura et al.

(10) Patent No.: US 12,032,865 B2
(45) Date of Patent: Jul. 9, 2024

(54) INFORMATION PROCESSING APPARATUS

(71) Applicant: NTT DOCOMO, INC., Chiyoda-ku (JP)

(72) Inventors: Kenichirou Matsumura, Chiyoda-ku (JP); Kuniichiro Naruse, Shinagawa-ku (JP); Keita Saito, Shibuya-ku (JP); Akira Kurosawa, Shibuya-ku (JP); Hiroki Takagaki, Shibuya-ku (JP); Kiwako Miura, Shibuya-ku (JP); Yuki Kobayashi, Shibuya-ku (JP); Takehisa Gokaichi, Shibuya-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 18/040,910

(22) PCT Filed: Dec. 28, 2020

(86) PCT No.: PCT/JP2020/049236
§ 371 (c)(1),
(2) Date: Feb. 7, 2023

(87) PCT Pub. No.: WO2022/049795
PCT Pub. Date: Mar. 10, 2022

(65) Prior Publication Data
US 2023/0325139 A1    Oct. 12, 2023

(30) Foreign Application Priority Data

Sep. 7, 2020  (JP) .................................. 2020-149642

(51) Int. Cl.
*G06F 3/14*    (2006.01)
*G06F 3/0481*   (2022.01)
*H04M 1/247*   (2021.01)

(52) U.S. Cl.
CPC .............. *G06F 3/14* (2013.01); *G06F 3/0481* (2013.01); *H04M 1/247* (2013.01)

(58) Field of Classification Search
None
See application file for complete search history.

(56) References Cited

U.S. PATENT DOCUMENTS 9,940,013 B2 *   4/2018  Choi ...................... G06F 3/0412
10,521,111 B2 * 12/2019  Sato .......................... G06T 3/40
(Continued)

FOREIGN PATENT DOCUMENTS

EP      2 940 572 A1    11/2015
JP    2010-134596 A      6/2010
(Continued)

OTHER PUBLICATIONS

International Search Report issued Feb. 9, 2021 in PCT/JP2020/049236, filed on Dec. 28, 2020, 4 pages (with English Translation).
(Continued)

*Primary Examiner* — Sepehr Azari
(74) *Attorney, Agent, or Firm* — Oblon, McClelland, Maier & Neustadt, L.L.P.

(57) ABSTRACT

The display states of a display device include a first display state and a second display state with a larger display area than the first display state. An information processing apparatus includes a display controller that controls the display device, an executer that executes at least one of a first App or a second App, and an acquirer that acquires a guide image. In response to the executer executing the first App when the display device is in the first display state, the acquirer acquires the guide image in accordance with a running state of the first App. The display controller causes the display device to display the guide image in the first display state.

16 Claims, 19 Drawing Sheets

(56) References Cited

U.S. PATENT DOCUMENTS

| | | | | |
|---|---|---|---|---|
| 2008/0158189 A1* | 7/2008 | Kim | | G06F 3/04886 |
| | | | | 345/173 |
| 2010/0138767 A1* | 6/2010 | Wang | | G06F 3/0481 |
| | | | | 715/769 |
| 2014/0004906 A1* | 1/2014 | Chi | | G06F 3/016 |
| | | | | 455/566 |
| 2014/0152606 A1* | 6/2014 | Kunitake | | G06F 1/1647 |
| | | | | 345/173 |
| 2014/0189583 A1* | 7/2014 | Yang | | G06F 3/04883 |
| | | | | 715/800 |
| 2014/0365944 A1* | 12/2014 | Moore | | G09B 29/003 |
| | | | | 715/772 |
| 2015/0031417 A1* | 1/2015 | Lee | | H04W 4/12 |
| | | | | 455/566 |
| 2015/0227249 A1* | 8/2015 | Kim | | G06F 1/1694 |
| | | | | 345/173 |
| 2016/0259514 A1* | 9/2016 | Sang | | G06F 3/0487 |
| 2019/0042066 A1* | 2/2019 | Kim | | H04M 1/725 |
| 2020/0252579 A1* | 8/2020 | Fukui | | H04N 21/4316 |
| 2021/0064146 A1* | 3/2021 | Stern | | G06F 1/3265 |
| 2022/0066602 A1* | 3/2022 | Park | | H04L 67/12 |
| 2022/0148473 A1* | 5/2022 | Kim | | H05K 5/0017 |
| 2022/0300129 A1* | 9/2022 | Zhu | | G06F 3/0482 |

FOREIGN PATENT DOCUMENTS

| | | |
|---|---|---|
| JP | 2012-141903 A | 7/2012 |
| JP | 2012-174217 A | 9/2012 |
| JP | 2019-67309 A | 4/2019 |

OTHER PUBLICATIONS

Japanese Office Action dated Apr. 30, 2024, issued in Japanese Patent Application No. 2022-646875 (with English translation).

* cited by examiner

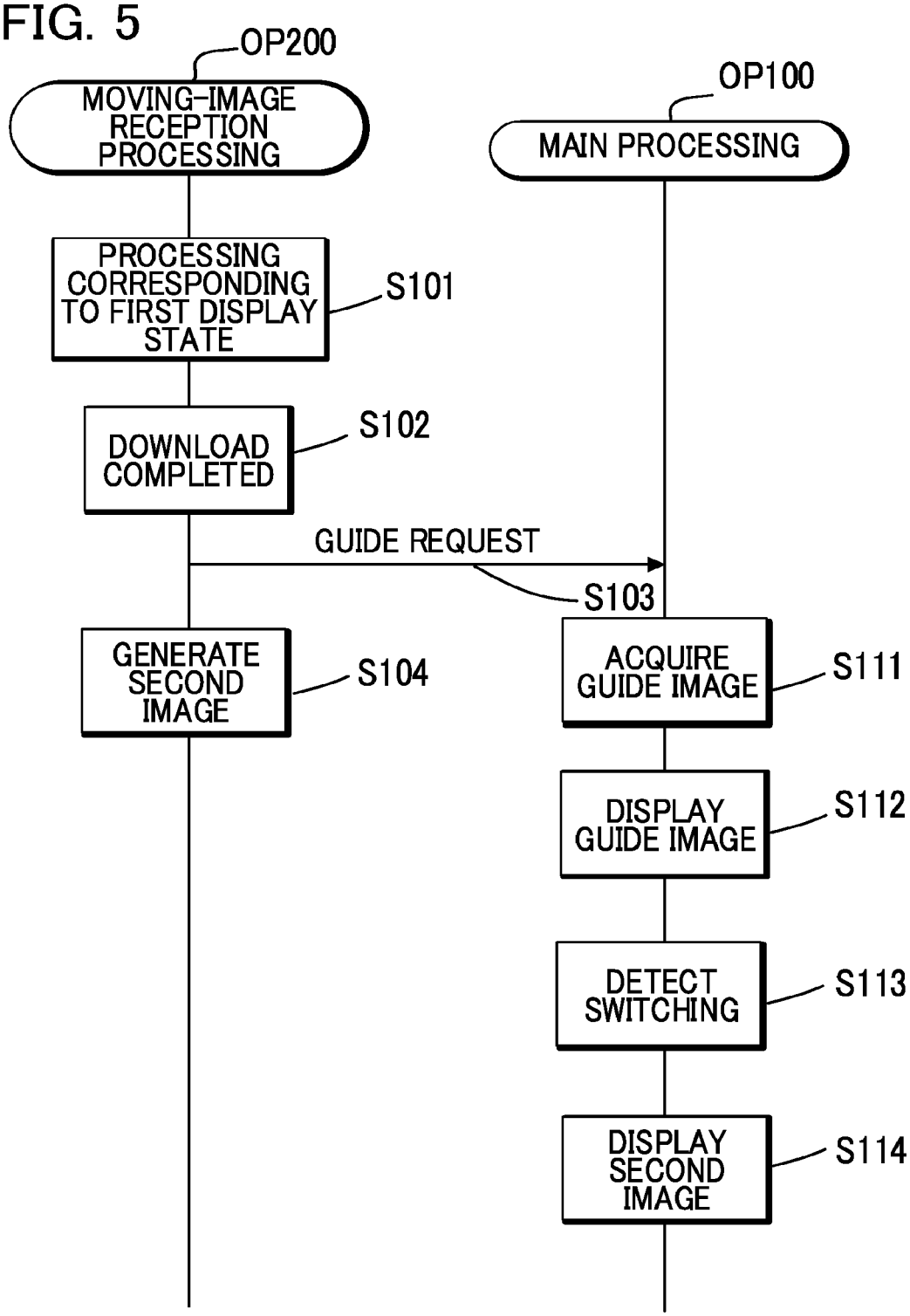

INFORMATION PROCESSING APPARATUS

TECHNICAL FIELD

The present invention relates to an information processing apparatus.

BACKGROUND ART

Portable information processing apparatuses, such as smartphones, are generally not equipped with large-screen displays because of the need for portability. However, application programs that are desirably displayed on a large screen, such as application programs that display maps, have been provided for smartphones, and there is a growing need for smartphones to allow display on a large screen. Patent Document 1 proposes a foldable smartphone to address such needs.

The smartphone disclosed in Patent Document 1 includes a first body, a second body, and a hinge that connects the first body and the second body. The first body includes a rectangular-shaped first screen, and the second body includes a rectangular-shaped second screen. As the hinge rotates, the first body and the second body rotate from a closed state in which the angle formed by the first screen and the second screen (hereinafter referred to as a "hinge angle") is 0 degrees, through an open state in which the hinge angle is 180 degrees, to a back-to-back state in which the hinge angle is 360 degrees.

RELATED ART DOCUMENT

Patent Document

Patent Document 1: Japanese Patent Application Laid-Open Publication No. 2019-67309

SUMMARY OF THE INVENTION

Problem to be Solved by the Invention

According to the smartphone disclosed in Patent Document 1, by setting the hinge angle to 360 degrees, a user can set the display state of the smartphone to, for example, a small-screen display state in which the first screen and the second screen face outward to allow a single display on the first screen. In addition, by setting the hinge angle to 180 degrees, the user can set the display state of the smartphone to a large-screen display state to allow display on both the first screen and the second screen. However, in Patent Document 1, whether to set the display state of the smartphone to the small-screen display state or the large-screen display state is left to the user's discretion. Thus, if the user is unaware that using the smartphone in the large screen display state has become preferable, the user will maintain the small screen display state and miss the opportunity to use the smartphone in the large screen display state. This prevents users from fully benefiting from the use in the large screen display state.

The present invention has been made in view of the above circumstances, and one of problems to be solved is to provide a technique that gives a user an opportunity to use an information processing apparatus usable in a small-screen display state and a large-screen display state in the large-screen display state.

Means of Solving Problem

An information processing apparatus according to one aspect of the present invention includes a display controller that controls a display device, an executer that executes at least one of a first application program or a second application program, and an acquirer that acquires a guide image, in which display states of the display device include a first display state and a second display state, a display area in the second display state is larger than a display area in the first display state, the guide image is an image that prompts switching from the first display state to the second display state, in response to the executer executing the first application program in the first display state, the acquirer acquires the guide image in accordance with a running state of the first application program, in response to the executer executing the second application program in the first display state, the acquirer acquires the guide image in accordance with a running state of the second application program, and the display controller causes the display device to display the guide image in the first display state.

An information processing apparatus according to another aspect of the present invention is an information processing apparatus with a display device, and the information processing apparatus includes a detector that detects that a state of the information processing apparatus, a display controller that controls the display device, and an acquirer that acquires a guide image, in which display states of the display device include a first display state and a second display state, a display area in the second display state is larger than a display area in the first display state, the guide image is an image that prompts switching from the first display state to the second display state, and the display controller causes the display device to display the guide image in the first display state based on a result of detection by the detector.

Effect of the Invention

According to this invention, it is possible to give a user an opportunity to use an information processing apparatus in a second display state, and it is possible for the user to benefit from the use in the second display state.

BRIEF DESCRIPTION OF THE DRAWINGS

FIG. 5 is a sequence diagram showing cooperation between video reception processing to be executed by the processor in accordance with a video reception application and main processing to be executed by the processor in accordance with a control program in a first operation example of the information processing apparatus.

MODES FOR CARRYING OUT THE INVENTION

First Embodiment

Figure 1A:
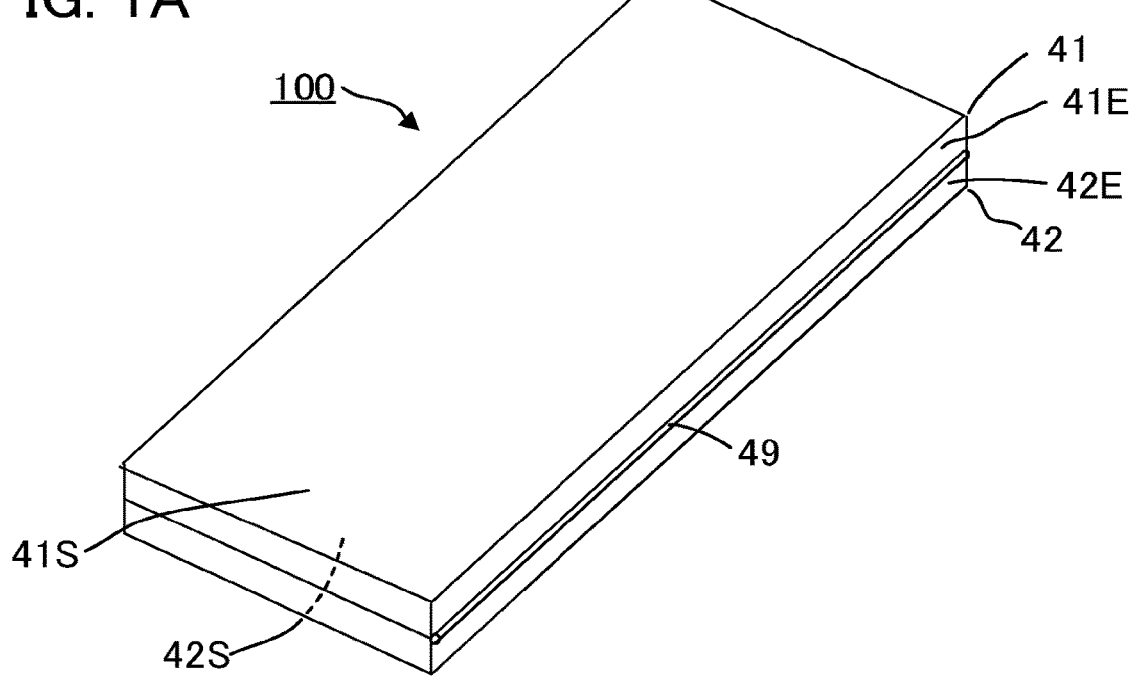
FIG. 1A is a perspective view showing an appearance of an information processing apparatus according to a first embodiment of the present invention in a first display state.
Figure 1B:
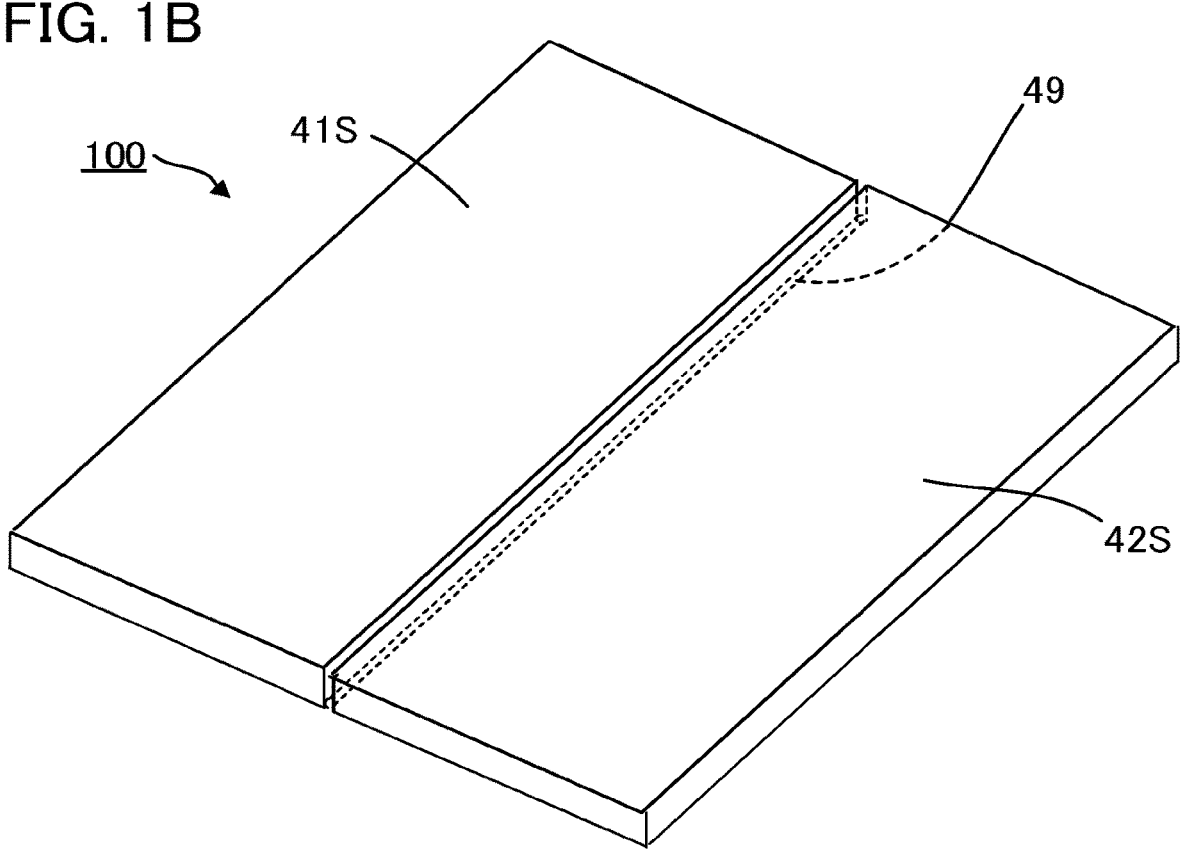
FIG. 1B is a perspective view showing an appearance of the information processing apparatus in a second display state.

FIGS. 1A and 1B are perspective views showing an appearance of an information processing apparatus 100 according to a first embodiment of the present invention. The information processing apparatus 100 in the present embodiment is a smartphone. It is to be noted that the information processing apparatus 100 may be a portable information processing apparatus other than a smartphone, such as a mobile phone or a tablet terminal.

As shown in FIGS. 1A and 1B, the information processing apparatus 100 includes bodies 41 and 42 and a hinge 49. Each of the bodies 41 and 42 is has a rectangular parallelepiped plate shape. The body 41 has a rectangular-shaped display surface 41S on one of the two front and back faces, and the body 42 has a rectangular-shaped display surface 42S on one of the two front and back faces. The display surfaces 41S and 42S are display surfaces of a display device of the information processing apparatus 100 according to the present embodiment. This display device will be described later. In the present embodiment, the display surfaces 41S and 42S have the same display area.

The body 41 has four rectangular-shaped end faces surrounding its two front and back faces. Of the four end faces, an end face 41E is one of the two end faces on the long side of the two front and back faces of the body 41. Similarly, the body 42 has four rectangular-shaped end faces surrounding its two front and back faces. Of the four end faces, an end face 42E is one of the two end faces on the long side of the two front and back faces of the body 42. The hinge 49 rotatably connects the bodies 41 and 42. The hinge 49 connects the long side opposite to the long side facing the display surface 41S at the end face 41E and the long side opposite to the long side facing the display surface 42S at the end face 42E.

In the present embodiment, as the hinge 49 rotates, a hinge angle formed by the display surfaces 41S and 42S changes. In the present embodiment, by setting the hinge angle to 360 degrees, a user can cause the display surfaces 41S and 42S to face outward and set the display state of the display device of the information processing apparatus 100 to a first display state to perform display only on the display surface 41S, as shown in FIG. 1A. In addition, by setting the hinge angle to 180 degrees, the user can cause the display surfaces 41S and 42S to face the user and set the display state of the display device of the information processing apparatus 100 to a second display state to perform display on both the display surfaces 41S and 42S, as shown in FIG. 1B. The display area in the second display state is greater than the display area in the first display state.

Figure 2:
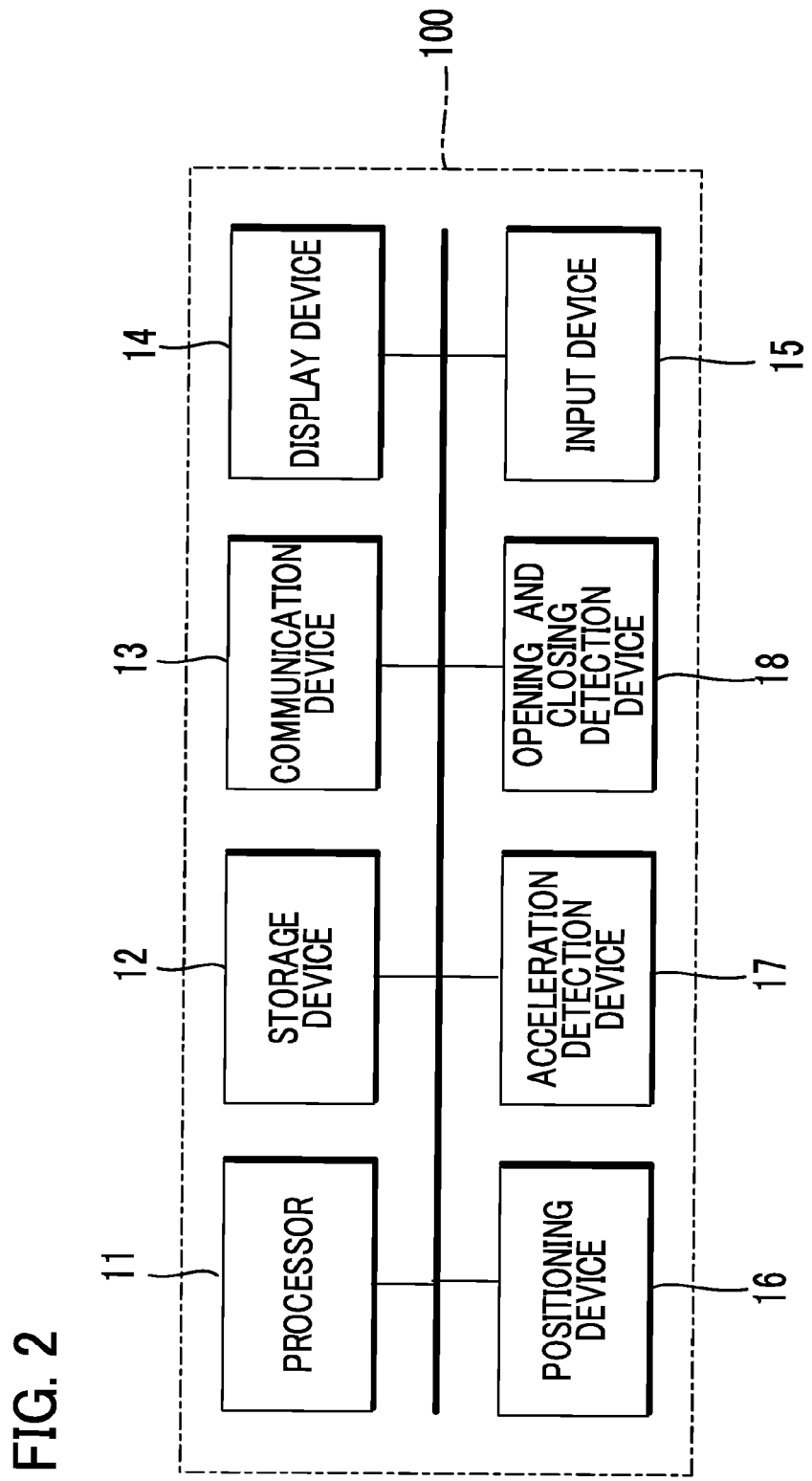
FIG. 2 is a block diagram showing a hardware configuration of the information processing apparatus.

FIG. 2 is a block diagram showing an example of a hardware configuration of the information processing apparatus 100. As shown in FIG. 2, the information processing apparatus 100 is a computer including a processor 11, a storage device 12, a communication device 13, a display device 14, an input device 15, a positioning device 16, an acceleration detection device 17, and an opening and closing detection device 18. The elements of the information processing apparatus 100 are mutually connected by a single bus or a plurality of buses. It is to be noted that the term "apparatus" in this specification may be replaced with another term, such as "circuit", "device", or "unit". In addition, each element of the information processing apparatus 100 may be constituted by one component or a plurality of components, and some elements of the information processing apparatus 100 may be omitted.

The processor 11 is a processor that controls the entire information processing apparatus 100, and includes, for example, one or a plurality of chips. The processor 11 is constituted by, for example, a central processing unit (CPU) including an interface with peripheral devices, an arithmetic device, a register, and the like. Some or all of the functions of the processor 11 may be implemented by hardware, such as a digital signal processor (DSP), an application specific integrated circuit (ASIC), a programmable logic device (PLD), or a field programmable gate array (FPGA). The processor 11 executes various types of processing in parallel or sequentially.

The storage device 12 is a recording medium readable by the processor 11 and stores a plurality of programs to be executed by the processor 11 and various types of data to be used by the processor 11. The storage device 12 is constituted by, for example, a nonvolatile storage circuit, such as a read only memory (ROM), an erasable programmable ROM (EPROM), or an electrically erasable programmable ROM (EEPROM), and a volatile storage circuit, such as a random access memory (RAM).

The communication device 13 is a device that communicates with another device via a communication network, such as a mobile communication network or the Internet. The communication device 13 is also referred to as, for example, a network device, a network controller, a network card, or a communication module. For example, an application program received by the communication device 13 from a distribution server (not shown) via a communication network is stored in the storage device 12. In addition, the communication device 13 includes a wireless device that performs short-range wireless communication, such as Bluetooth (registered trademark).

The display device 14 displays various images on the display surfaces 41S and 42S under the control of the processor 11. For example, various display panels, such as liquid crystal display panels and organic EL display panels, are suitably used as the display device 14. The display device having the display surface 41S and the display device having the display surface 42S are physically separate display devices. However, the information processing apparatus 100 according to the present embodiment displays a single image across the display surfaces 41S and 42S or executes a single set of processing by causing the display by the display surface 41S and the display by the display surface 42S to cooperate in some cases. Therefore, in the present embodiment, a display device having a display surface 41S and a display device having a display surface 42S are grouped together and are treated as a single display device 14.

The input device 15 is a device for inputting information to be used by the information processing apparatus 100. The input device 15 accepts operations by a user. Specifically, the input device 15 accepts a user operation for inputting signs, such as numbers and characters, and a user operation for selecting an icon displayed on the display device 14. For example, a touch panel that detects contact with the display surface of the display device 14 is suitable as the input device 15. It is to be noted that the input device 15 may include a plurality of operation elements that can be operated by the user.

The positioning device 16 is specifically a GPS device, receives radio waves from a plurality of satellites, and generates position information from the received radio waves. The position information may be in any format as long as the position can be specified. The position information indicates, for example, the latitude and longitude of the information processing apparatus 100. The position information is obtained from the positioning device 16 in this example, but the information processing apparatus 100 may acquire the position information by any method. For example, a cell ID assigned to a base station as a communication destination of the information processing apparatus 100 may be acquired as the position information. Based on the information processing apparatus 100 communicating with an access point of a wireless LAN, the information processing apparatus 100 may acquire the position information by referring to a database storing associations between an actual address (position) and an identification address (MAC address) on a network assigned to the access point.

The acceleration detection device 17 is a device that detects acceleration acting on the information processing apparatus 100. Various acceleration sensors, such as piczoresistive sensors and capacitive sensors, may be used as the acceleration detection device 17. The opening and closing detection device 18 is a device that detects a display state of the display device 14. Specifically, the opening and closing detection device 18 includes a sensor that detects an angle formed by the display surfaces 41S and 42S, that is, a hinge angle of the hinge 49, and outputs a detection signal having a magnitude corresponding to the hinge angle. When a hinge angle θ indicated by a detection signal is within the range of, for example, 360°<θ<270°, the opening and closing detection device 18 detects that the display state of the display device 14 is the first display state (closed state). When a hinge angle θ indicated by a detection signal is within the range of, for example, 270°<θ<90°, the opening and closing detection device 18 detects that the display state of the display device 14 is the second display state (open state).

Figure 3A:
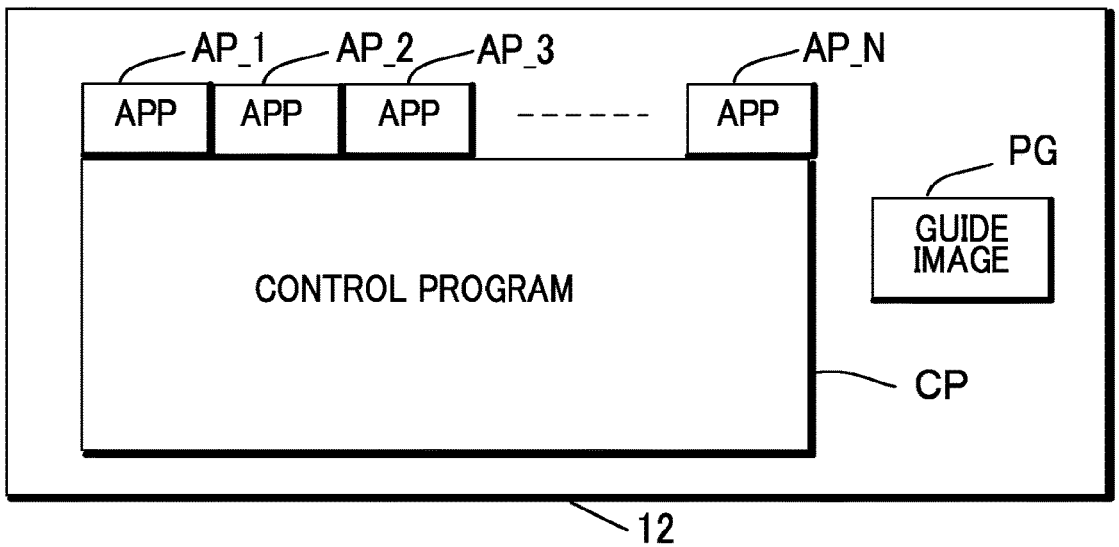
FIG. 3A is a diagram showing content stored in a storage device of the information processing apparatus.

FIG. 3A is a diagram showing content stored in the storage device 12. As shown in FIG. 3A, the storage device 12 stores various application programs (hereinafter, abbreviated as Apps) AP_1 to AP_N (N is an integer of 2 or more) that form an upper hierarchy and a control program CP that forms a lower hierarchy. Here, the Apps AP_1 to AP_N may be written in the storage device 12 at the time of factory shipment of the information processing apparatus 100 or may be downloaded to the storage device 12 via the communication device 13, for example. In addition, the storage device 12 stores a guide image PG. The guide image PG is an image that prompts the user to switch the first display state to the second display state.

Figure 3B:
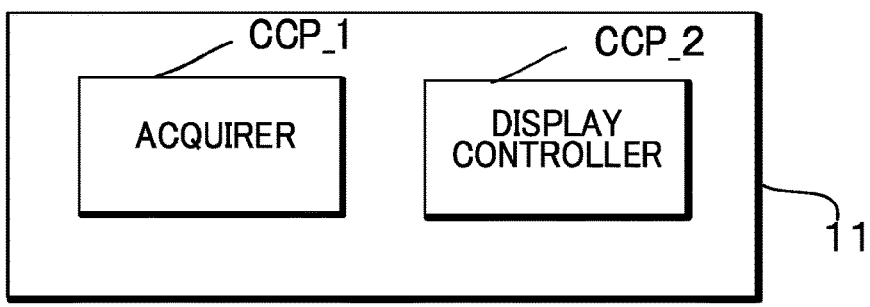
FIG. 3B is a block diagram showing a functional configuration of the information processing apparatus.

FIG. 3B is a block diagram showing a functional configuration of the processor 11. The processor 11 reads the control program CP and at least one of the Apps AP_1 to AP_N from the storage device 12. The processor 11 is an executer that executes the read control program CP and at least one of the Apps AP_1 to AP_N. The processor 11 functions as an acquirer CCP_1 by executing the control program CP. When the processor 11 executes a first App (first application program) among the Apps AP_1 to AP_N in the first display state, the acquirer CCP_1 acquires the guide image PG from the storage device 12 in accordance with the running state of the first App. In addition, when the processor 11 executes a second App (second application program) other than the first App in the first display state, the acquirer CCP_1 also acquires the guide image PG from the storage device 12 in accordance with the running state of the second App. As described above, a plurality of applications (a plurality of applications including the first App and the second App) among the Apps AP_1 to AP_N generate an opportunity to acquire the guide image PG. In the present embodiment, such an application running state serves as a trigger for acquiring the guide image PG. That is, in the present embodiment, when the running state of the first App or the running state of the second App by the processor 11 enters a predetermined running state, a guide request for requesting display of the guide image PG is generated. The acquirer CCP_1 acquires the guide image PG in response to the guide request.

In addition, the processor 11 functions as a display controller CCP_2 by executing the control program CP. The display controller CCP_2 displays a first image generated by execution of the application on the display surface 41S in the first display state. In addition, the display controller CCP_2 displays the guide image PG acquired by the acquirer CCP_1 on the display surface 41S in the first display state. The display of the guide image PG prompts the user to switch the first display state to the second display state. In addition, the display controller CCP_2 causes the display device 14 that is in the second display state, to display a second image generated by execution of the application that is the generator of the guide request, based on a detection by the opening and closing detection device 18 that the display state of the display device 14 is switched from the first display state to the second display state after the guide image PG is displayed on the display surface 41S in response to the guide request.

Operation in First Embodiment

Figure 4:
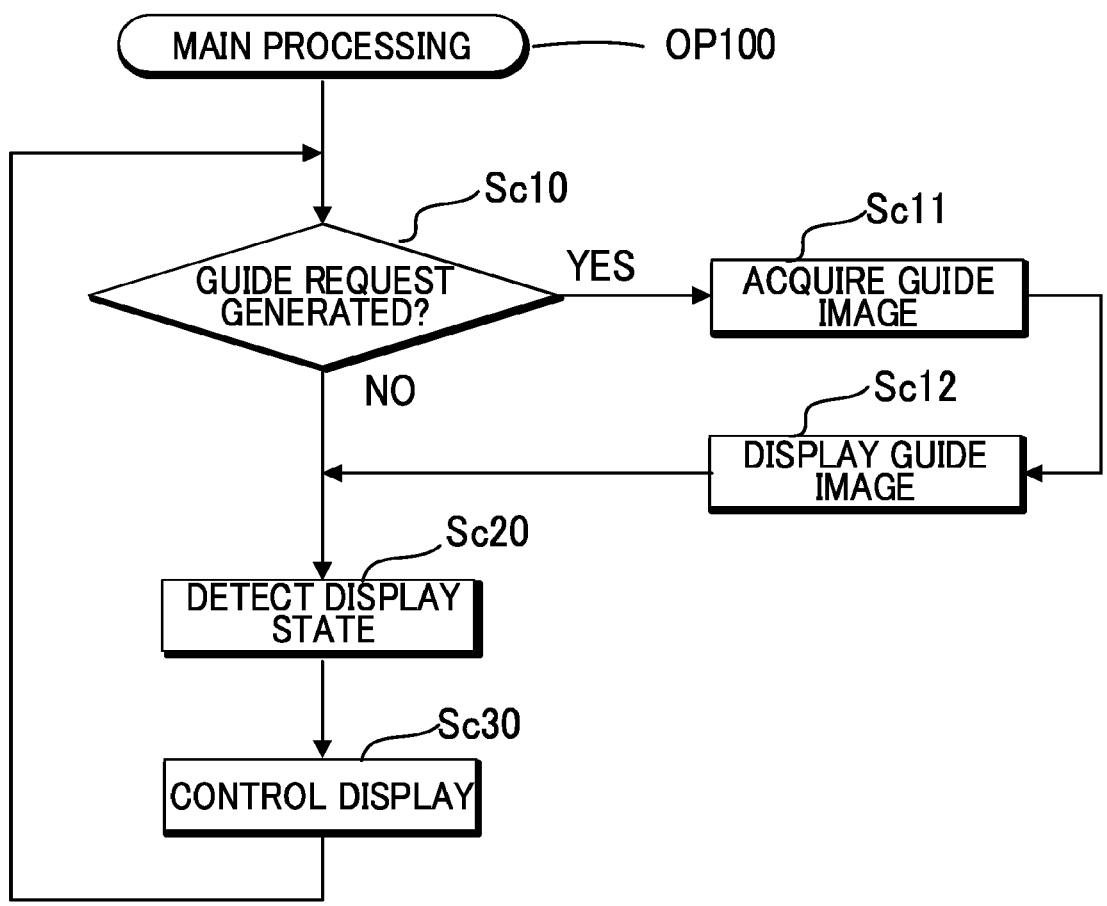
FIG. 4 is a flowchart showing a procedure of main processing to be executed by a processor of the information processing apparatus in accordance with a control program.

In the following, an operation in the present embodiment is described. FIG. 4 is a flowchart showing a procedure of main processing OP100 to be executed by the processor 11 in accordance with the control program CP in the present embodiment. In the present embodiment, when the information processing apparatus 100 is powered on, the processor 11 executes the control program CP. First, the processor 11 determines whether a guide request has been generated (step Sc10). When a result of the determination in step Sc10 is "YES", the processor 11 executes the processing as the acquirer CCP_1. That is, the processor 11 acquires the guide image PG by reading the guide image PG from the storage device 12 (step Sc11). Next, the processor 11 displays the guide image PG on the display surface 41S (step Sc12). Specifically, the guide image PG is rendered in the first image to be displayed on the display surface 41S. Then, the processor 11 proceeds the processing to step Sc20. On the other hand, when a result of the determination in step Sc10 is "NO", the processor 11 proceeds the processing to step Sc20.

Next, in step Sc20, the processor 11 uses the opening and closing detection device 18 to detect whether the display state of the display device 14 is the first display state or the second display state. Next, in step Sc30, the processor 11 executes display control. Specifically, the processor 11 displays the first image generated by execution of the application on the display surface 41S in the first display state. In addition, the processor 11 displays the second image generated by execution of the application on the display surface 41S or 42S or across both the display surfaces 41S and 42S in the second display state. Then, when the processing in step Sc30 terminates, the processor 11 returns the processing to step Sc10 again and repeats each processing described above. In the processing in each of the steps Sc12, Sc20, and Sc30 described above, the processor 11 functions as the display controller CCP_2.

In the present embodiment, the processor 11 executes the control program CP described above and any application among the Apps AP_1 to AP_N, thereby implementing various operations involving switching from the first display state to the second display state.

First Operation Example in First Embodiment

Figure 6A:
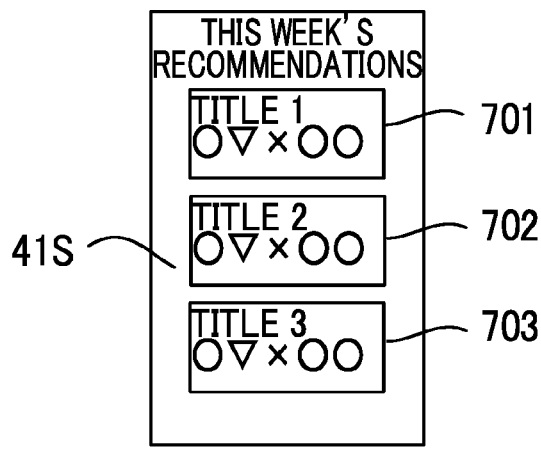
FIG. 6A is a diagram showing transition of a display screen of the information processing apparatus in the first operation example.
Figure 6B:
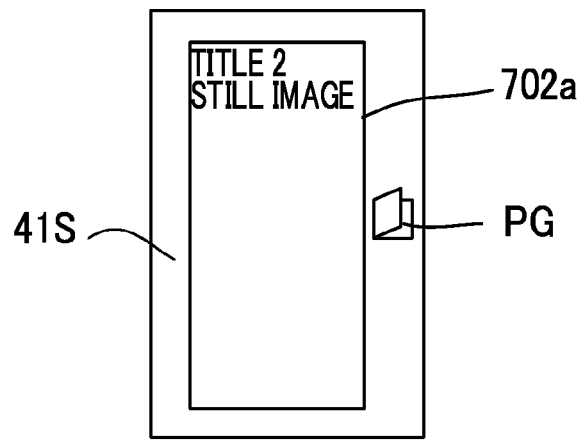
FIG. 6B is a diagram showing transition of a display screen of the information processing apparatus in the first operation example.
Figure 6C:
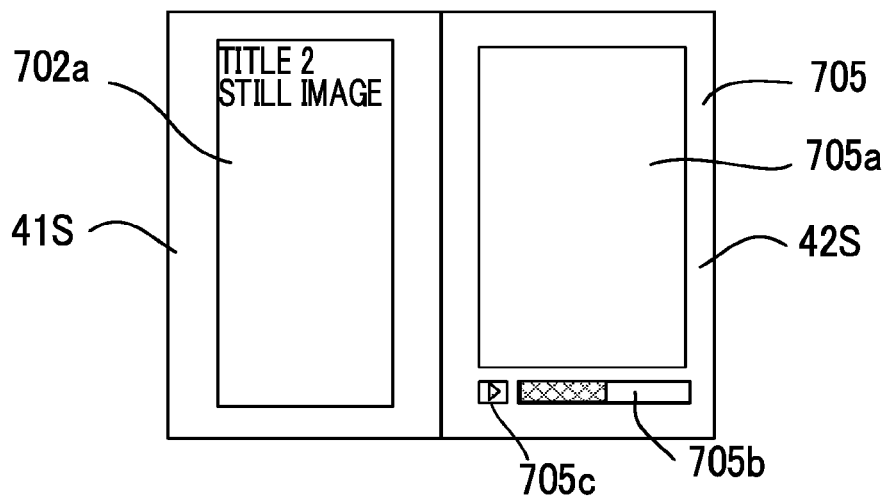
FIG. 6C is a diagram showing transition of a display screen of the information processing apparatus in the first operation example.

FIG. 5 is a sequence diagram showing cooperation between video reception processing OP200 to be executed by the processor 11 in accordance with a video reception App AP_1 and the main processing OP100 to be executed in accordance with the control program CP in a first operation example in the present embodiment. FIGS. 6A, 6B, and 6C are diagrams showing transitions of the display screen of the display device 14 in the first operation example.

In the first operation example, the processor 11 executes the video reception App AP_1 (first App), which is one of the Apps AP_1 to AP_N, and the control program CP. By executing the video reception App AP_1, the processor 11 executes the video reception processing OP200. By executing the control program CP, the processor 11 executes the main processing OP100.

In the initial state in the first operation example, the processor 11 executes processing corresponding to the first display state in accordance with the video reception App AP_1 (step S101). Specifically, as shown in FIG. 6A, the processor 11 displays menu images 701 to 703 indicating the titles of this week's recommended videos on the display surface 41S. In this state, when the user designates, for example, the menu image 702 displayed on the display surface 41S, the processor 11 downloads the video of the title 2 associated with the menu image 702 from a video distribution site on the network by the communication device 13. In addition, as shown in FIG. 6B, the processor 11 displays a still image 702a of the title 2 associated with the menu image 702 on the display surface 41S. It is to be noted that the guide image PG to be displayed on the display surface 41S in FIG. 6B is not displayed at this time.

Then, when detecting that the running state of the video reception App AP_1 has entered a predetermined running state, specifically, that downloading has been completed (step S102), the processor 11 generates a guide request in accordance with the video reception App AP_1 and delivers the generated guide request to the control program CP (step S103). The guide request is a request related to display of the guide image PG.

When the guide request is delivered to the control program CP, the processor 11 executes the processing as the acquirer CCP_1 in accordance with the control program CP. That is, the processor 11 acquires the guide image PG from the storage device 12 in accordance with the guide request (step S111). Next, the processor 11 executes the processing as the display controller CCP_2. That is, the processor 11 displays the guide image PG on the display surface 41S (step S112). FIG. 6B shows an example of the display on the display surface 41S at this time. As shown in FIG. 6B, the guide image PG is displayed on the display surface 41S together with a first image (in this example, the still image 702a of the title 2) generated by execution of the video reception App AP_1. In the example shown in FIG. 6B, the guide image PG is a video showing that a book is being opened. The guide image PG may be a still image. When the guide image PG is a video, an effect of easily attracting the user's attention can be obtained.

After the generation of the guide request (step S103), the processor 11 generates, in accordance with the video reception App AP_1, a second image displayable in the second display state in addition to the first image displayable in the first display state (step S104). However, when the display device 14 is in the first display state at this time, the display controller CCP_2 displays the first image on the display surface 41S. The second image generated in response to the generation of the guide request so as to display the second image without delay when the first display state is switched to the second display state.

After the processor 11 displays the guide image PG in accordance with the control program CP (step S112), when the user switches the first display state to the second display state, the processor 11 detects this switching by the opening and closing detection device 18 (step S113).

Upon detecting the switching, the processor 11 executes the processing as the display controller CCP_2. That is, the processor 11 causes the display device 14 to display the second image generated by execution of the video reception App AP_1 (step S114). FIG. 6C shows an example of the second image displayed on the display device 14. In the example shown in FIG. 6C, the second image includes the still image 702a of the title 2 to be downloaded displayed on the left display surface 41S, and a video playback screen 705 displayed on the right display surface 42S. In this example, the video playback screen 705 includes a scene portion 705a indicating a scene of the downloaded video, an indicator 705b indicating a playback position of the video, and an instruction portion 705c for instructing playback, stop, or reverse of the video.

As described above, in the first operation example, the processor 11 as the executer generates a first image (see FIG. 6A) by executing the video reception App AP_1, which is an example of the first App, when the display device 14 is in the first display state, and generates a second image (see FIG. 6C) by further executing the video reception App AP_1, which is the first App, in response to the running state of the first App entering into a predetermined state (completion of downloading) when the display device 14 is in the first display state. Then, when the display state of the display device 14 is switched from the first display state to the second display state after the guide image PG is displayed on the display surface 41S (see FIG. 6B), the display controller CCP_2 causes the display device 14 to display the second image (see FIG. 6C).

Since the guide image PG is displayed in response to the running state of the first App entering the predetermined state when the display device 14 is in the first display state, it is possible to suggest that the user switch to the second display state. As a result, in the first display state in which the display area is small, the user can use the information processing apparatus 100 compactly. Furthermore, since the guide image PG is displayed in response to the running state of the first App entering the predetermined state and then display in the second display state having a large display area becoming desirable, it is possible to make the user recognize the guide image PG at an appropriate timing.

The video reception App AP_1 is an example of the first App. The first App may be an application other than the video reception App AP_1. When the display device 14 is in the first display state and the running state of another application, which is not than the video reception App AP_1, enters the predetermined state, the guide image PG is displayed in the same manner as when the video reception App AP_1 is the first App. That is, the guide image PG is an image that prompts switching from the first display state to the second display state and is used together with a plurality of applications. If the image that prompts switching is different for the respective application, the user may not be able to understand the meaning of each image. In this example, since the guide image PG is used together with the plurality of applications, the user only needs to be able to recognize one guide image PG that prompts switching. Therefore, the convenience of the information processing apparatus 100 is improved.

Figure 6D:
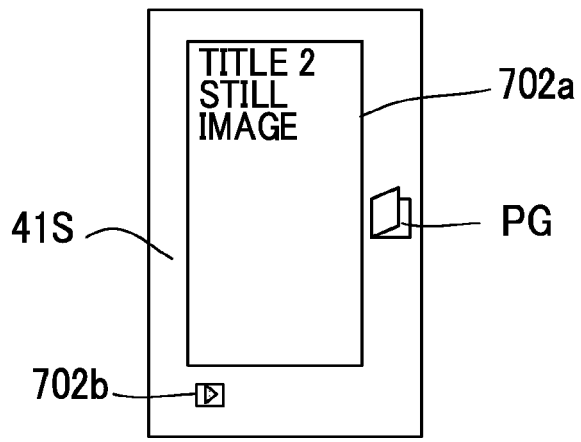
FIG. 6D is a diagram showing transition of a display screen of the information processing apparatus in a modification example of the first operation example.
Figure 6E:
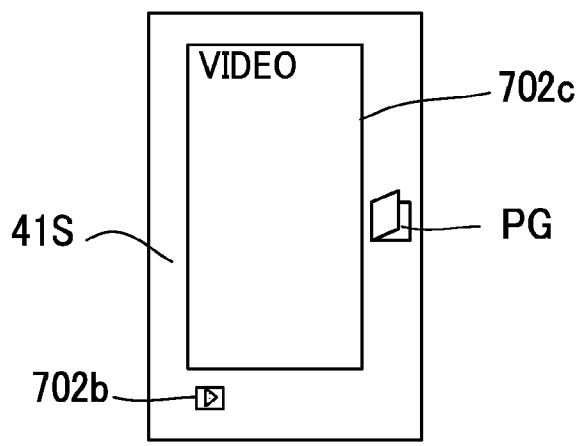
FIG. 6E is a diagram showing transition of a display screen of the information processing apparatus in a modification example of the first operation example.
Figure 6F:
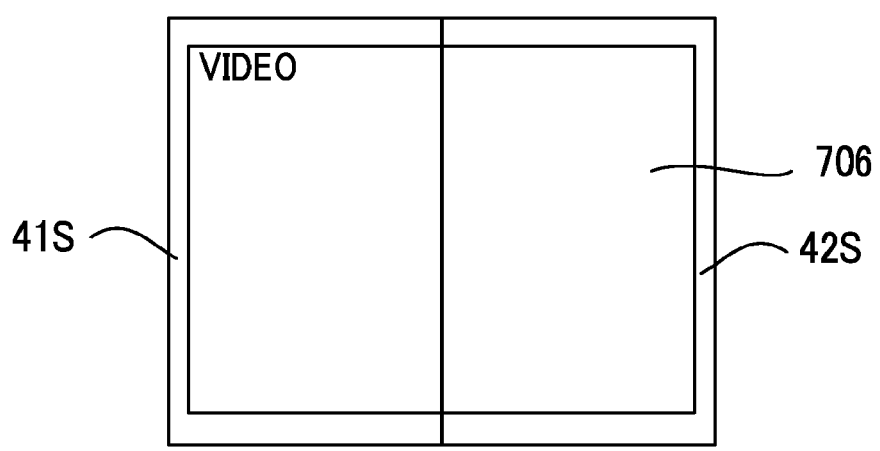
FIG. 6F is a diagram showing transition of a display screen of the information processing apparatus in a modification example of the first operation example.

The following modification examples of the first operation example are conceivable. In the first operation example, the processor 11 displays the guide image PG on the display surface 41S when downloading of a video is completed. In a modification example, a video playback button 702b may be displayed as shown in FIG. 6D. In the modification example, the video playback button 702b may be displayed together with the guide image PG as shown in FIG. 6D. When the user touches the video playback button 702b in the first display state, the still image 702a is switched to a video 702c as shown in FIG. 6E. In this case, the guide image PG is displayed on the display surface 41S to prompt switching to the second display state. The user touching the video playback button 702b means that the user's intention to watch the video is clear. Therefore, when the display state is switched from the first display state to the second display state after the video playback button 702b is touched, the processor 11 displays a single video 706 on the display surfaces 41S and 42S as shown in FIG. 6F. On the other hand, when the display state is switched from the first display state to the second display state before the video playback button 702b is touched, the processor 11 displays the images shown in FIG. 6C on the display surfaces 41S and 42S. Accordingly, the user can watch the video on the large screen.

Figure 6G:
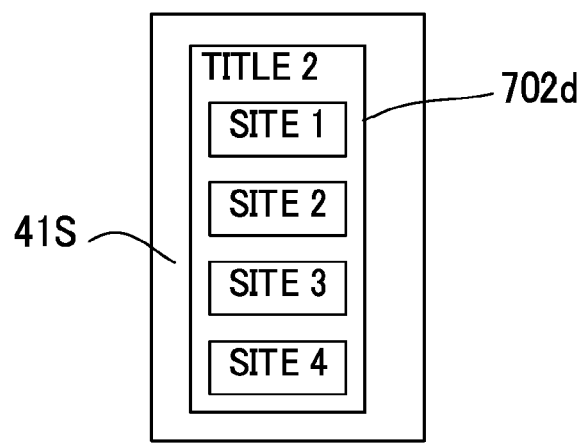
FIG. 6G is a diagram showing transition of a display screen of the information processing apparatus in a modification example of the first operation example.
Figure 6H:
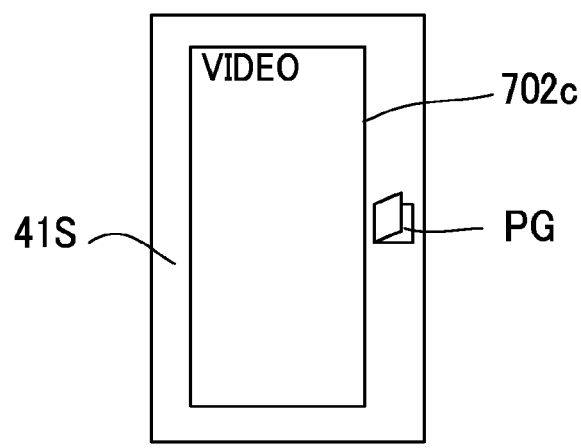
FIG. 6H is a diagram showing transition of a display screen of the information processing apparatus in a modification example of the first operation example.

In addition, in the first operation example, the processor 11 downloads the video of the title designated by the user from a video distribution site on the network. However, instead of this, access information for accessing a site at which the video can be watched may be displayed on the display surface 41S. For example, the processor 11 displays an image 702d indicating the access information about sites 1 to 4 at which the video of the title 2 can be watched, as shown in FIG. 6G. However, the guide image PG is not displayed. When the access information is designated by the user, the processor 11 downloads the video from the site on the network using the access information and displays the screen shown in FIG. 6H. As shown in FIG. 6H, the video 702c and the guide image PG are displayed on the display surface 41S. The guide image PG prompts the user to switch to the second display state. When the first display state is switched to the second display state, the processor 11 displays the single video 706 on the display surfaces 41S and 42S as shown in FIG. 6F. Accordingly, the user can watch the video on the large screen.

Second Operation Example in First Embodiment

Figure 7:
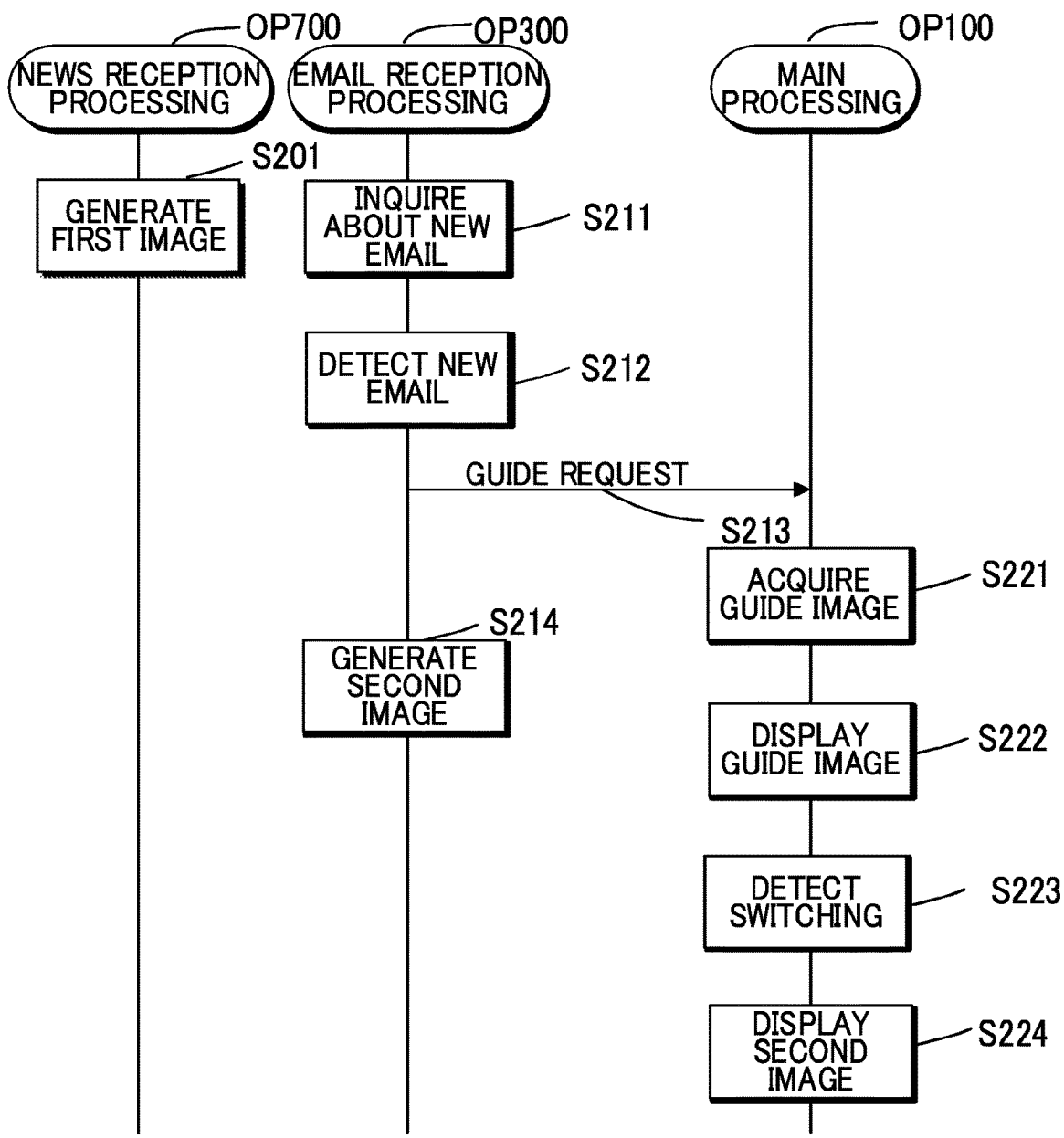
FIG. 7 is a sequence diagram showing cooperation among news reception processing to be executed by the processor in accordance with a news reception application, email processing executed by the processor in accordance with an email application, and main processing to be executed by the processor in accordance with the control program in a second operation example of the information processing apparatus.

FIG. 7 is a sequence diagram showing cooperation among news reception processing OP700 to be executed by the processor 11 in accordance with a news App AP_6, email reception processing OP300 to be executed in accordance with an email App AP_2, and the main processing OP100 executed in accordance with the control program CP in a second operation example of the present embodiment.

In the second operation example, the processor 11 executes the news App AP_6, which is an example of the first App, an email App AP_2, which is an example of the second App, and the control program CP. By executing the news App AP_6, the processor 11 executes the news reception processing OP700. By executing the email App AP_2, the processor 11 executes the email reception processing OP300. By executing the control program CP, the processor 11 executes the main processing OP100.

Figure 8A:
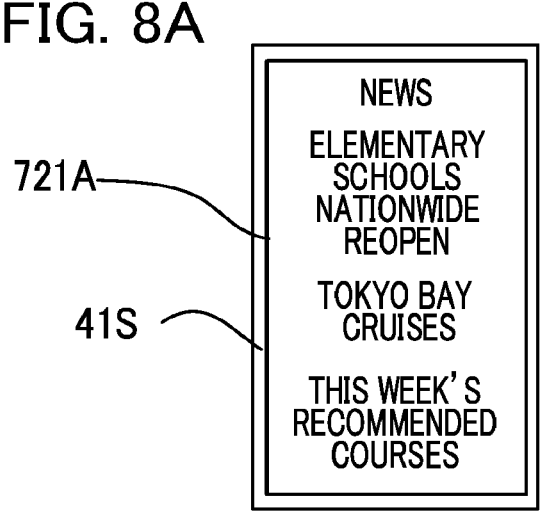
FIG. 8A is a diagram showing transition of a display screen of the information processing apparatus in the second operation example.

In the initial state of the second operation example, the display device 14 is in the first display state, and the processor 11 generates a first image by executing the news App AP_6, which is the first App (step S201). In the first display state, the processor 11 functions as the display controller CCP_2 by executing the control program CP. The display controller CCP_2 displays the first image on the display surface 41S. Specifically, the processor 11 displays a news image 721A on the display surface 41S as shown in FIG. 8A. The news image 721A indicates today's news.

On the other hand, in the initial state in the second operation example, the processor 11 executes the email App AP_2, which is a second App, as background processing of the first App. Here, the background processing is processing performed on the back side (background) behind foreground processing (the video reception processing OP200 in this example) displayed in front of the user in a multitasking environment.

In accordance with the email App AP_2, the processor 11 periodically repeats processing of inquiring about new email at an email server by the communication device 13 (step S211). Then, when the running state of the email App AP_2, which is the second App, is in a predetermined running state, that is, the running state in which new email is detected (step S212), the processor 11 generates a guide request in accordance with the email App AP_2 and delivers the guide request to the control program CP (step S213). Then, the processor 11 generates a second image indicating the received email in accordance with the email App AP_2 (step S214).

Figure 8B:
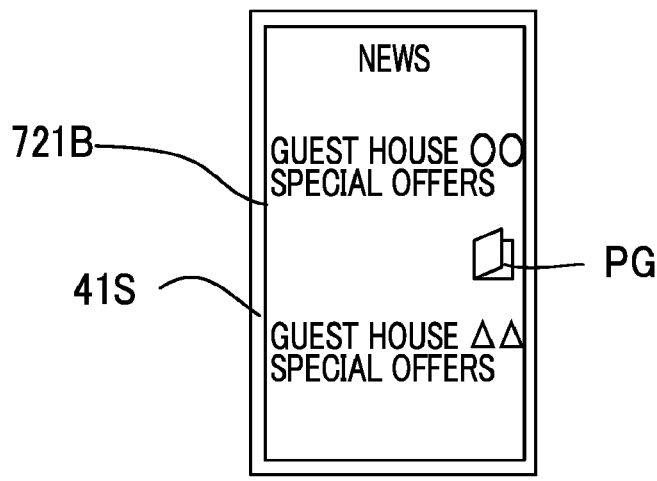
FIG. 8B is a diagram showing transition of a display screen of the information processing apparatus in the second operation example.

When the guide request is delivered to the control program CP, the processor 11 executes the processing as the acquirer CCP_1 in accordance with the control program CP. That is, the processor 11 acquires the guide image PG from the storage device 12 in accordance with the guide request (step S221). Next, the processor 11 executes the processing as the display controller CCP_2. That is, the processor 11 displays the guide image PG on the display surface 41S (step S222). FIG. 8B shows an example of the display on the display surface 41S at this time. As shown in FIG. 8B, the guide image PG is displayed on the display surface 41S together with a first image (in this example, a news image 721B) generated by execution of the news App AP_6.

Thereafter, when the user switches the first display state to the second display state, the processor 11 detects this switching by the opening and closing detection device 18 (step S223).

When detecting the switching of the display state, the processor 11 executes the processing as the display controller CCP_2. That is, the processor 11 causes the display device 14 to display the second image generated by execution of the email App AP_2, which is the second App (step S224).

Figure 8C:
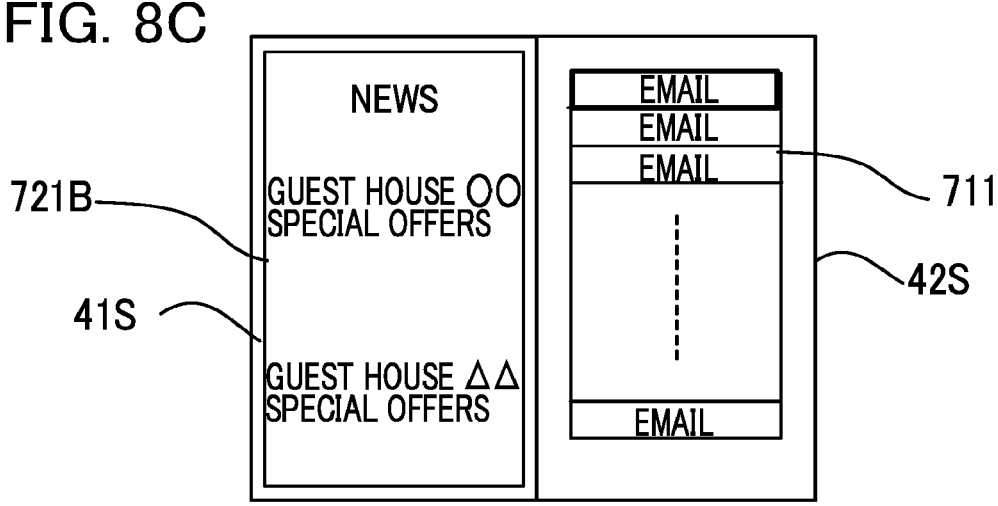
FIG. 8C is a diagram showing transition of a display screen of the information processing apparatus in the second operation example.

FIG. 8C shows an example of the second image displayed by the display device 14. In this example, the second image includes the news image 721B displayed on the display surface 41S and a received-email list image 711 displayed on the display surface 42S.

As described above, in the second operation example, the processor 11, which is the executer, generates a first image by executing the news App AP_6, which is the first App, when the display device 14 is in the first display state, and generates a second image (an image indicating a received email) by executing the email App AP_2, which is the second App, in response to the running state of the email App AP_2, which is the second App, entering into a predetermined state (detection of a new email) when the display device 14 is in the first display state. Then, when the display state of the display device 14 is switched from the first display state to the second display state after the guide image PG is displayed on the display surface 41S, the display controller CCP_2 causes the display device 14 to display the second image.

Second Embodiment

Figure 9:
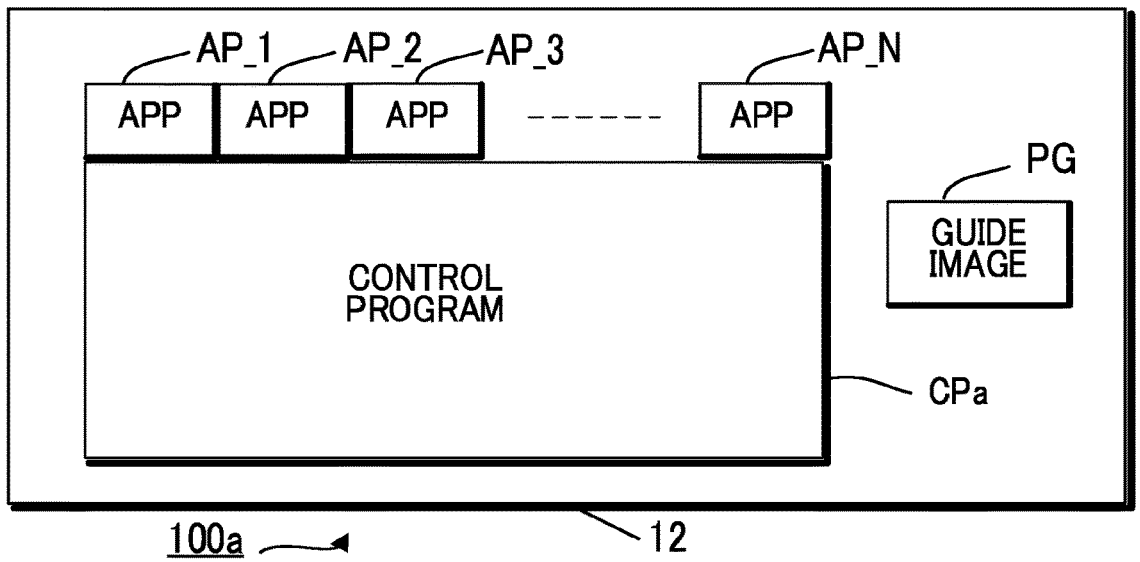
FIG. 9 is a diagram showing content stored in a storage device of an information processing apparatus according to a second embodiment of the present invention.

A hardware configuration of an information processing apparatus 100a according to a second embodiment of the present invention is substantially the same as that in the first embodiment. FIG. 9 is a diagram showing content stored in a storage device 12 of the information processing apparatus 100a according to the second embodiment of the present invention. In the present embodiment, the storage device 12 stores a control program CPa instead of the control program CP in the first embodiment.

Figure 10:
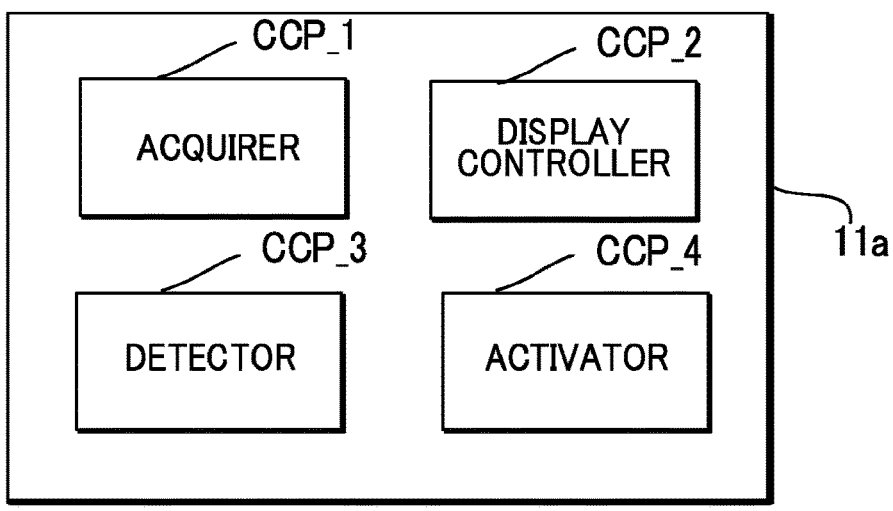
FIG. 10 is a block diagram showing a functional configuration of the information processing apparatus.

FIG. 10 is a block diagram showing a functional configuration of a processor 11a according to the present embodiment. In the present embodiment, the processor 11a functions as an acquirer CCP_1, a display controller CCP_2, a detector CCP_3, and an activator CCP_4 by executing the control program CPa. The acquirer CCP_1 and the display controller CCP_2 are substantially the same as those in the first embodiment. The detector CCP_3 detects that the state of the information processing apparatus 100a is a predetermined state. The predetermined state corresponds to a state in which the moving speed of the information processing apparatus 100a satisfies a predetermined condition, a state in which the information processing apparatus 100a receives a specific signal, a state in which the remaining battery charge of the information processing apparatus 100a has decreased, or the like. In addition, when the detector CCP_3 detects the predetermined state, the activator CCP_4 activates, among Apps AP_1 to AP_N, an App that is associated with the detected predetermined state.

Operation of Second Embodiment

Figure 11:
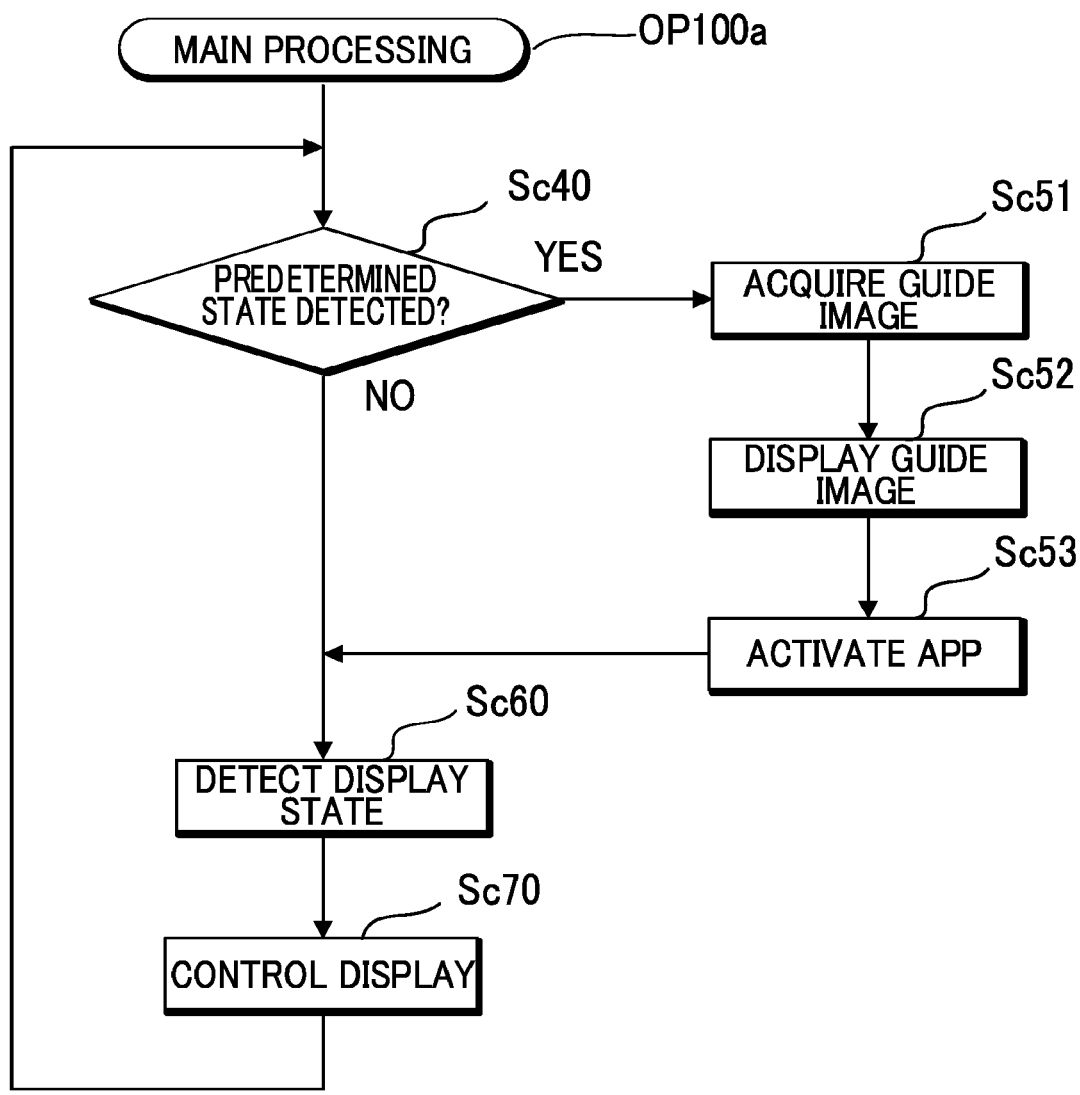
FIG. 11 is a flowchart showing a procedure of main processing executed by a processor of the information processing apparatus in accordance with a control program.

Next, an operation in the present embodiment is described. FIG. 11 is a flowchart showing a procedure of a main processing OP100a to be executed by the processor 11a in accordance with the control program CPa in the present embodiment. In the present embodiment, when the information processing apparatus 100a is powered on, the processor 11a executes the control program CPa. By executing the control program CPa, the processor 11a executes the main processing OP100a. First, the processor 11a executes the processing as the detector CCP_3. That is, the processor 11a determines whether the state of the information processing apparatus 100a is the predetermined state (step Sc40). Specifically, the processor 11a determines whether the moving speed of the information processing apparatus 100a satisfies the predetermined condition, whether a signal received by the information processing apparatus 100a is the specific signal, or whether the remaining battery charge of the information processing apparatus 100a has decreased to a predetermined level or lower. When a result of the determination in step Sc40 is "YES", the processor 11a executes the processing as the acquirer CCP_1. That is, the processor 11a acquires a guide image PG by reading the guide image PG from the storage device 12 (step Sc51). Next, the processor 11a executes the processing as the display controller CCP_2. That is, the processor 11a displays the guide image PG on a display surface 41S (step Sc52). Next, the processor 11a executes the processing as the activator CCP_4. That is, the processor 11a activates an application that is associated with the state detected in step Sc40 among the Apps AP_1 to AP_N (step Sc53). Then, the processor 11a proceeds the processing to step Sc60. On the other hand, when a result of the determination in step Sc40 is "NO", the processor 11a proceeds the processing to step Sc60.

Next, in step Sc60, the processor 11a uses an opening and closing detection device 18 to detect whether the display state of the display device 14 is a first display state or a second display state. Next, in step Sc70, the processor 11a executes display control. Specifically, the processor 11a displays a first image generated by execution of the application on the display surface 41S in the first display state. In addition, the processor 11a displays a second image generated by execution of the application on the display surface 41S or 42S or across both the display surfaces 41S and 42S in the second display state. Then, when the processing in step Sc70 is completed, the processor 11a returns the processing to step Sc40 again and repeats each processing described above.

First Operation Example in Second Embodiment

Figure 12:
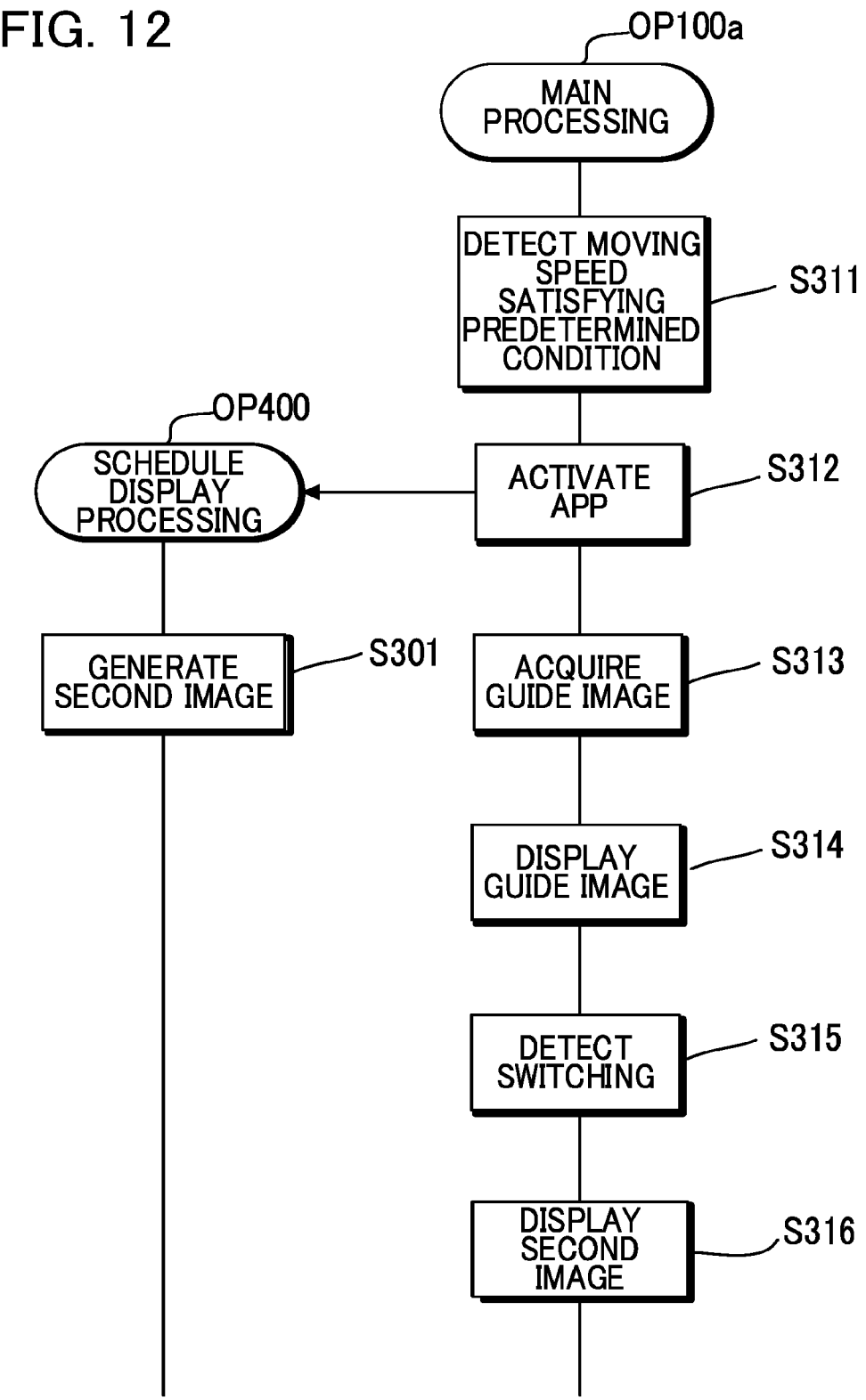
FIG. 12 is a sequence diagram showing cooperation between schedule display processing to be executed by the processor in accordance with a schedule display application and main processing to be executed by the processor in accordance with a control program in a first operation example of the information processing apparatus.

FIG. 12 is a sequence diagram showing cooperation between schedule display processing OP400 to be executed by the processor 11a in accordance with a schedule display App AP_3 and the main processing OP100a to be executed in accordance with the control program CPa in a first operation example of the present embodiment. In the first operation example, by executing the schedule display App AP_3, the processor 11a executes the schedule display processing OP400. In addition, by executing the control program CPa, the processor 11a executes the main processing OP100a.

Figure 13A:
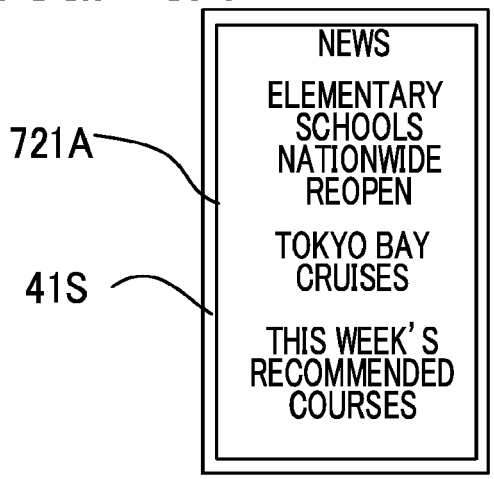
FIG. 13A is a diagram showing transition of a display screen of the information processing apparatus in the first operation example.

In the first operation example, by executing the control program CPa, the processor 11a executes the display control in step Sc70 shown in FIG. 11. In the display control, when the display state of the display device 14 is the first display state, the processor 11a displays a first image generated by execution of a news App AP_6 on the display surface 41S. As shown in FIG. 13A, the processor 11a displays a news image (first image) 721A on the display surface 41S. In addition, the processor 11a executes the processing as the detector CCP_3 in step Sc40 of FIG. 11. In the first operation example shown in FIG. 12, the detector CCP_3 uses an acceleration detection device 17 to detect that the moving speed of the information processing apparatus 100a satisfies the predetermined condition (step S311). The detector CCP_3 calculates the moving speed of the information processing apparatus 100a by integration of the acceleration output from the acceleration detection device 17. In this example, the predetermined condition is set such that it can be detected that the information processing apparatus 100a is moving on a train. The predetermined condition may require that the moving speed be equal to, or greater than, a threshold, or may require that the moving speed be a change particular to a train. The particular change means a series of changes in moving speed, such as a train accelerating as it starts, the train maintaining a constant moving speed after the start, and then the train decelerating to a stop.

Figure 13B:
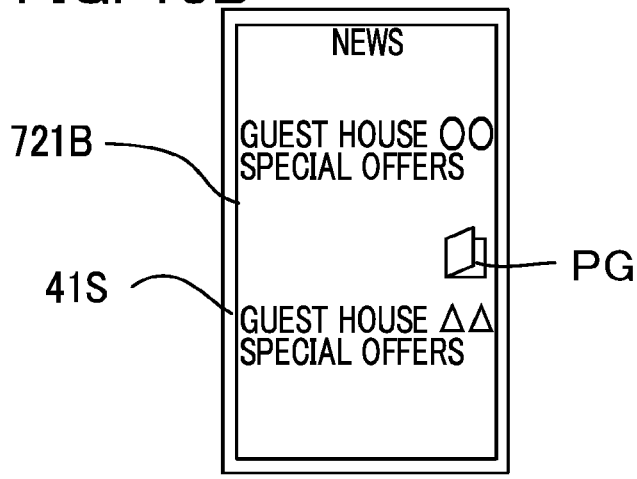
FIG. 13B is a diagram showing transition of a display screen of the information processing apparatus in the first operation example.

When detecting that the moving speed of the information processing apparatus 100a satisfies the predetermined condition (that is, the information processing apparatus 100a is moving on a train), the processor 11a executes the processing as the activator CCP_4. That is, the processor 11 activates the schedule display App AP_3 that is associated with the state of moving by train (step S312). Next, the processor 11a executes the processing as the acquirer CCP_1 in accordance with the control program CPa. That is, the processor 11a acquires the guide image PG from the storage device 12 (step S313). Next, the processor 11a executes the processing as the display controller CCP_2. That is, the processor 11a displays the guide image PG on the display surface 41S (step S314). FIG. 13B shows an example of the image displayed on the display surface 41S at this time. As shown in FIG. 13B, the guide image PG is displayed on the display surface 41S together with the news image 721B.

On the other hand, the processor 11a generates a second image indicating the schedule of the user after the current time in accordance with the schedule display App AP_3 activated in step S312 (step S301).

Then, after the display of the guide image (step S314), when the user switches the display state of the display device 14 from the first display state to the second display state, the processor 11a detects this switching by the opening and closing detection device 18 (step S315).

Figure 13C:
FIG. 13C is a diagram showing transition of a display screen of the information processing apparatus in the first operation example.

When detecting the switching of the display state, the processor 11a executes the processing as the display controller CCP_2 in accordance with the control program CPa. That is, the processor 11a causes the display device 14 to display the second image generated by execution of the schedule display App AP_3 (step S316). FIG. 13C shows an example of the second image displayed by the display device 14. In this example, the second image includes the news image 721B displayed on the display surface 41S and a schedule image 722 displayed on the display surface 42S. The schedule image 722 is an image indicating one or a plurality of schedules after the current time.

As described above, in the first operation example, in response to the detector CCP_3 detecting a state of moving on a train, the activator CCP_4 activates the schedule display App AP_3, which is associated with the detected state. In addition, the acquirer CCP_1 acquires the guide image PG, and the display controller CCP_2 causes the display device 14 to display the guide image PG. Then, when the first display state is switched to the second display state, the display controller CCP_2 causes the display device 14 to display the second image (see FIG. 13) generated by execution of the schedule display App AP_3.

Second Operation Example in Second Embodiment

Figure 14:
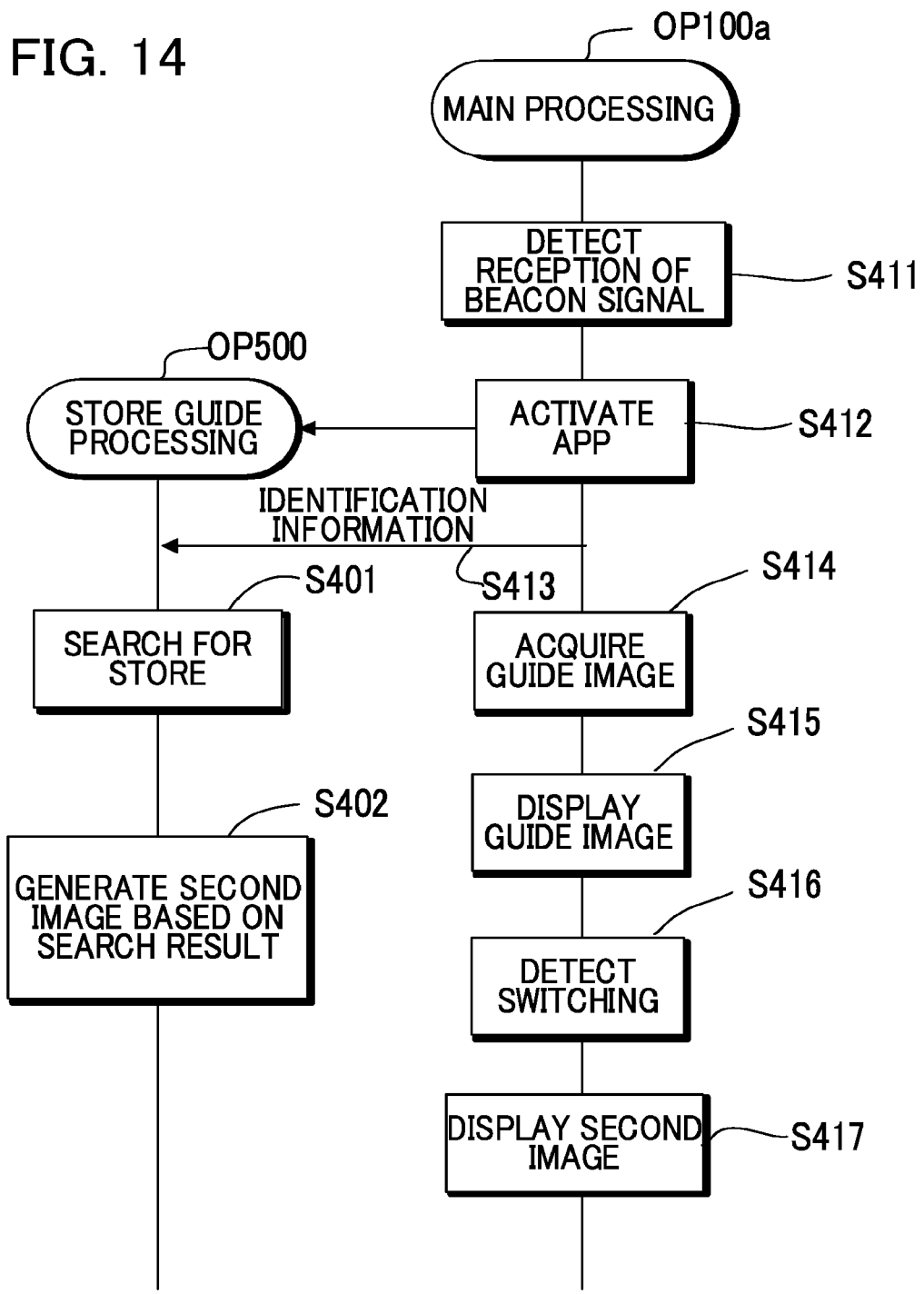
FIG. 14 is a sequence diagram showing cooperation between store guide processing to be executed by the processor in accordance with a store guide application and main processing to be executed by the processor in accordance with the control program in a second operation example of the information processing apparatus.

FIG. 14 is a sequence diagram showing cooperation between store guide processing OP500 to be executed by the processor 11a in accordance with a store guide App AP_4 and the main processing OP100a to be executed in accordance with the control program CPa in a second operation example of the present embodiment. In the second operation example, by executing the store guide App AP_4, the processor 11a executes the store guide processing OP500. In addition, by executing the control program CPa, the processor 11a executes the main processing OP100a.

Figure 15A:
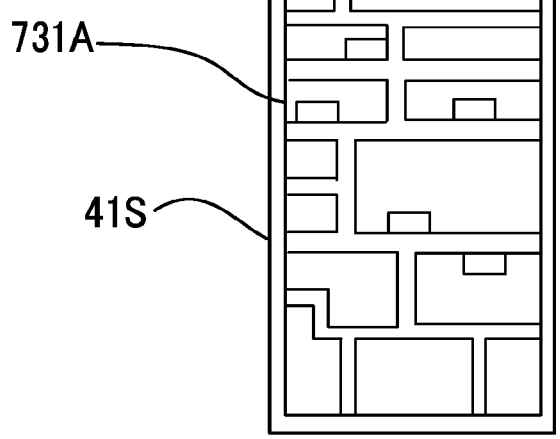
FIG. 15A is a diagram showing transition of a display screen of the information processing apparatus in the second operation example.

In the second operation example, by executing the control program CPa, the processor 11a executes the display control in step Sc70 of FIG. 11. In the display control, when the display state of the display device 14 is the first display state, the processor 11a displays a first image generated by execution of the application on the display surface 41S. In this example, the processor 11a executes a map App AP_5 that displays a map around the current position of the user, and displays a map image 731A as the first image on the display surface 41S as shown in FIG. 15A. In addition, the processor 11a executes the processing as the detector CCP_3 in step Sc40 of FIG. 11. In the second operation example shown in FIG. 14, the user of the information processing apparatus 100a visits a certain store, and the detector CCP_3 detects that a communication device 13 of the information processing apparatus 100a has received a beacon signal (specific signal) from a short-range wireless device installed in the store (step S411).

Figure 15B:
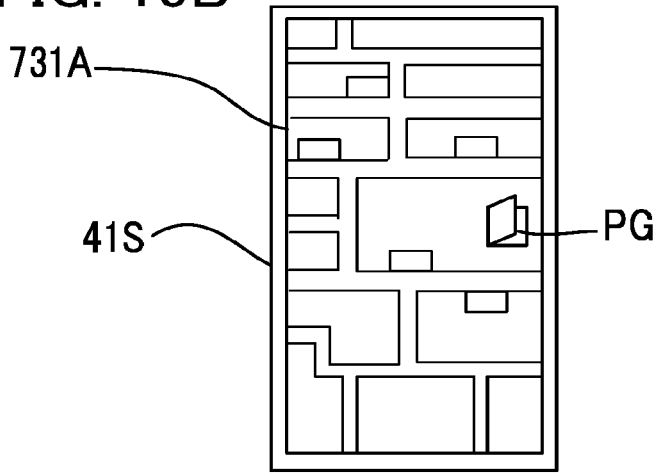
FIG. 15B is a diagram showing transition of a display screen of the information processing apparatus in the second operation example.

When detecting the reception of the beacon signal, the processor 11a executes the processing as the activator CCP_4. That is, the processor 11a activates the store guide App AP_4 which is associated with the state of receiving the beacon signal (step S412). Next, the processor 11a extracts identification information of the store, which is a transmitter of the beacon signal, from the beacon signal, and delivers the identification information to the activated store guide App AP_4 (step S413). Next, the processor 11a executes the processing as the acquirer CCP_1 in accordance with the control program CPa. That is, the processor 11a acquires the guide image PG from the storage device 12 (step S414). Next, the processor 11a executes the processing as the display controller CCP_2. That is, the processor 11a displays the guide image PG on the display surface 41S (step S415). FIG. 15B shows an example of the image displayed on the display surface 41S at this time. As shown in FIG. 15B, the guide image PG is displayed on the display surface 41S together with the map image 731A.

On the other hand, the processor 11a searches for the store in accordance with the store guide App AP_4 activated in step S412 (step S401). In the store search, the identification information of the store delivered in step S413 is used as a search key. Then, the processor 11a generates a second image that guides the user in the store the user has visited based on the search result (step S402).

Then, after the display of the guide image (step S415), when the user switches the display state of the display device 14 from the first display state to the second display state, the processor 11a detects this switching by the opening and closing detection device 18 (step S416).

Figure 15C:
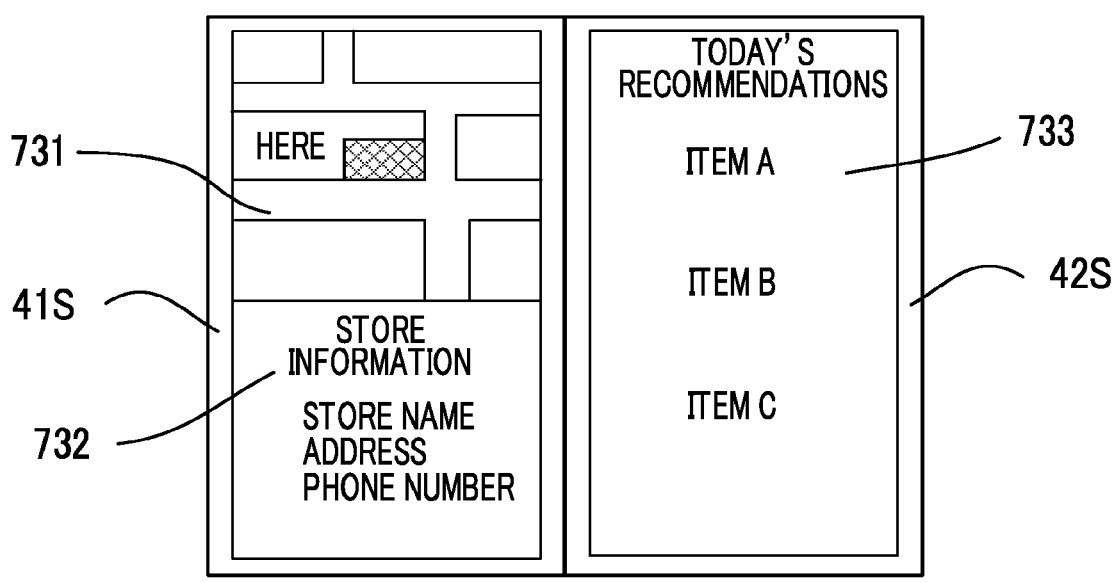
FIG. 15C is a view showing transition of a display screen of the information processing apparatus in the second operation example.

When detecting the switching of the display state, the processor 11a executes the processing as the display controller CCP_2 in accordance with the control program CPa. That is, the processor 11a causes the display device 14 to display the second image generated by execution of the store guide App AP_4 (step S417). FIG. 15C shows an example of the second image displayed by the display device 14. In this example, the second image includes a map image 731 and a store information image 732 displayed on the display surface 41S, and an item guide image 733 displayed on the display surface 42S. The map image 731 is an image showing a map around the store visited by the user. The store information image 732 is an image indicating information such as the store name, the address, and the telephone number of the store the user is visiting. The item guide image 733 is an image indicating information regarding an item provided in the store the user is visiting, for example, information regarding a discount or a usable coupon.

As described above, in the second operation example, in response to the detector CCP_3 detecting a state in which the information processing apparatus 100a has received a specific signal (for example, a beacon signal), the activator CCP_4 activates the store guide App AP_4 associated with the detected state. In addition, the acquirer CCP_1 acquires the guide image PG, and the display controller CCP_2 causes the display device 14 to display the guide image PG. Then, when the first display state is switched to the second display state, the display controller CCP_2 causes the display device 14 to display a second image (see FIG. 15C) generated by execution of the store guide App AP_4.

Third Operation Example in Second Embodiment

Figure 16:
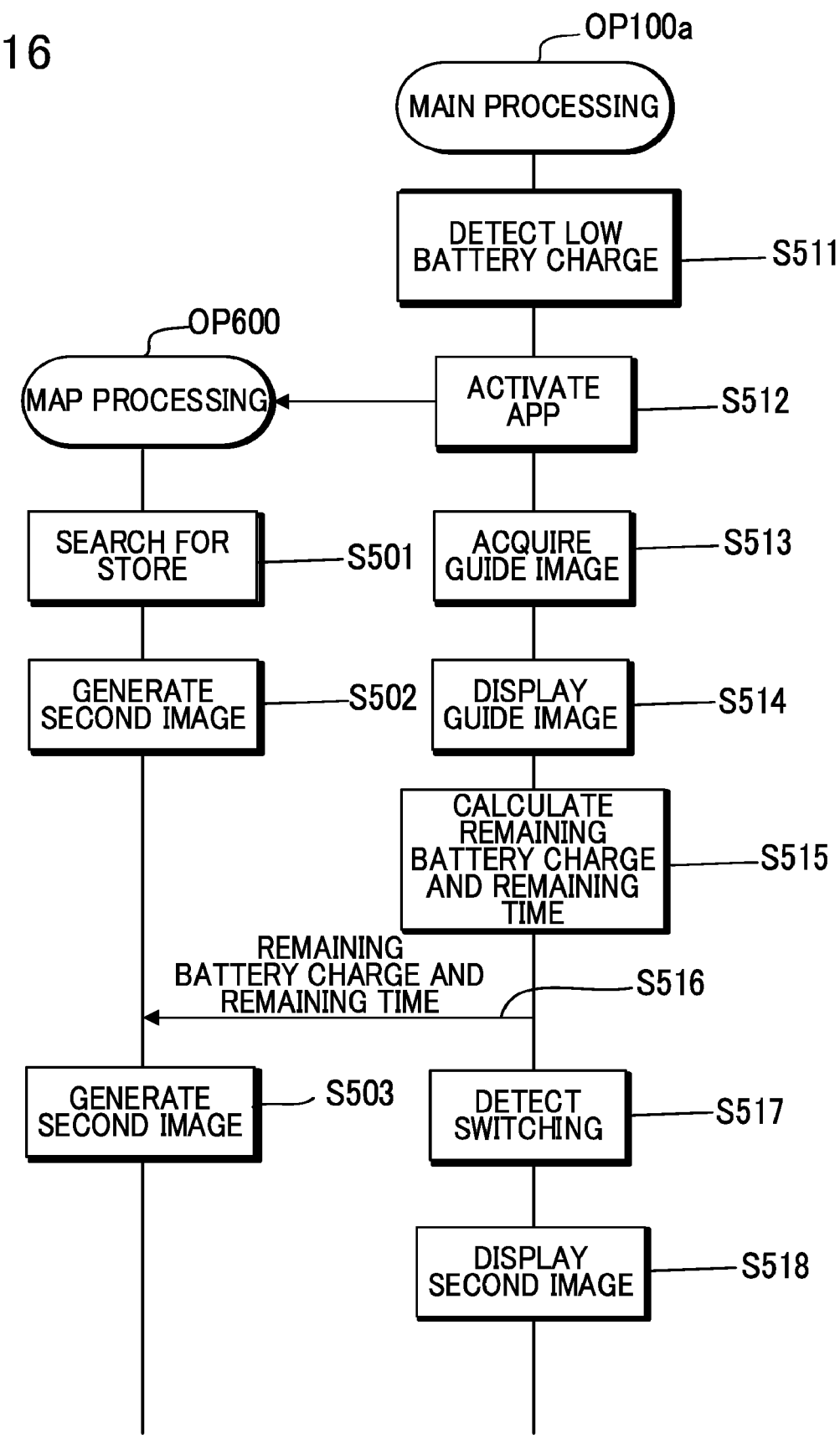
FIG. 16 is a sequence diagram showing cooperation between map processing to be executed by the processor in accordance with a map application and main processing to be executed by the processor in accordance with a control program in a third operation example of the information processing apparatus.

FIG. 16 is a sequence diagram showing cooperation between map processing OP600 to be executed by the processor 11a in accordance with a map App AP_5 and the main processing OP100a to be executed in accordance with the control program CPa in a third operation example of the present embodiment. In the third operation example, by executing the map App AP_5, the processor 11a executes the map processing OP600. In addition, by executing the control program CPa, the processor 11a executes the main processing OP100a.

Figure 17A:
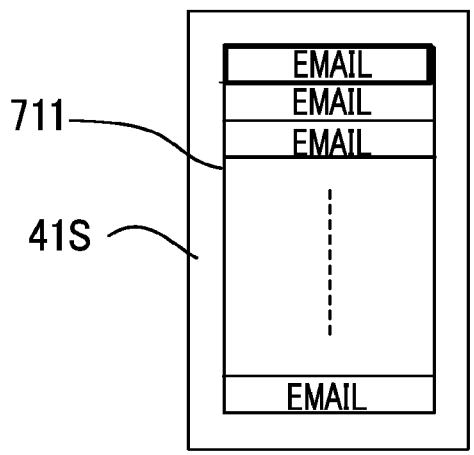
FIG. 17A is a diagram showing transition of a display screen of the information processing apparatus in the third operation example.

In the third operation example, by executing the control program CPa, the processor 11a executes the display control in step Sc70 of FIG. 11. In the display control, when the display state of the display device 14 is the first display state, the processor 11a displays a first image generated by execution of the application on the display surface 41S. In this example, the processor 11a executes the email App AP_2 and displays a received-email list image 711 on the display surface 41S as the first image as shown in FIG. 17A. In addition, the processor 11a executes the processing as the detector CCP_3 in step Sc40 of FIG. 11. In the third operation example shown in FIG. 16, the detector CCP_3 detects that the battery charge of the information processing apparatus 100a has decreased to a predetermined threshold or less (step S511).

Figure 17B:
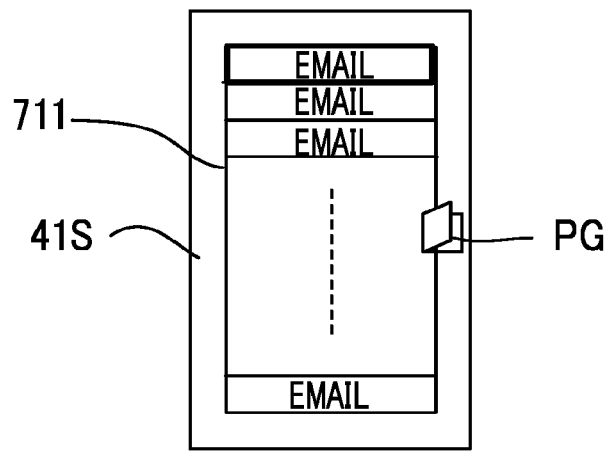
FIG. 17B is a diagram showing transition of a display screen of the information processing apparatus in the third operation example.

When detecting the decrease in the battery charge, the processor 11a executes the processing as the activator CCP_4. That is, the processor 11a activates the map App AP_5 which is associated with the state of the decrease in the battery charge (step S512). Next, the processor 11a executes the processing as the acquirer CCP_1 in accordance with the control program CPa. That is, the processor 11a acquires the guide image PG from the storage device 12 (step S513). Next, the processor 11a executes the processing as the display controller CCP_2. That is, the processor 11a displays the guide image PG on the display surface 41S (step S514). FIG. 17B shows an example of the image displayed on the display surface 41S at this time. As shown in FIG. 17B, the guide image PG is displayed on the display surface 41S together with the received-email list image 711. The guide image PG is displayed after the activation of the map App AP_5 because the activation of the map App AP_5 finalizes that a second image is to be generated by the map App AP_5.

On the other hand, the processor 11a searches for stores at which the battery of the information processing apparatus 100a can be charged in accordance with the map App AP_5 activated in step S512 (step S501). In the store search, the processor 11a obtains the current position of the information processing apparatus 100a by a positioning device 16 to search for stores at which the battery of the information processing apparatus 100a can be charged within a range of a predetermined distance from the current position. Then, the processor 11a generates a map image indicating the locations of the stores at which the battery can be charged as the second image based on a result of the search (step S502).

After the display of the guide image PG (step S514), the processor 11a periodically repeats processing of calculating the battery charge and the remaining time before the information processing apparatus 100a shuts down based on the battery charge (step S515). In addition, every time the battery charge and the remaining time are calculated, the processor 11 delivers information indicating the battery charge and the remaining time to the map App AP_5 (step S516).

In response to reception of the delivery of the information indicating the battery charge and the remaining time in the process of executing the map App AP_5, the processor 11a generates a second image reflecting the battery charge and the remaining time (step S503).

Thereafter, when the user switches the display state of the display device 14 from the first display state to the second display state, the processor 11a detects this switching by the opening and closing detection device 18 (step S517).

Figure 17C:
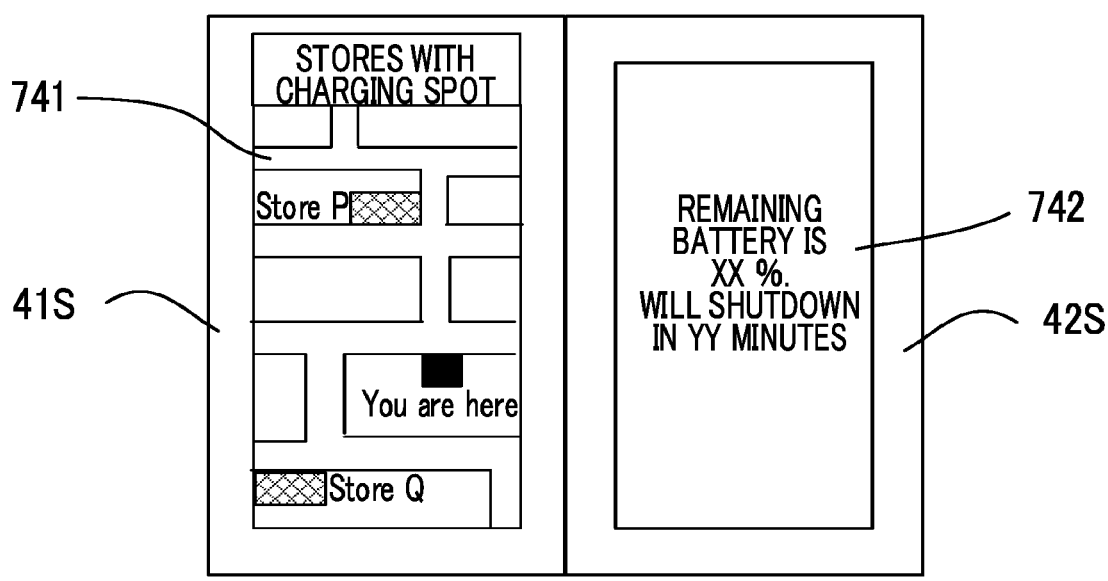
FIG. 17C is a view showing transition of a display screen of the information processing apparatus in the third operation example.

When detecting the switching of the display state, the processor 11a executes the processing as the display controller CCP_2 in accordance with the control program CPa. That is, the processor 11a causes the display device 14 to display the second image generated by execution of the map App AP_5 (step S518). FIG. 17C shows an example of the second image displayed by the display device 14. In this example, the second image includes a map image 741 displayed on the display surface 41S, and a battery charge information image 742 displayed on the display surface 42S. The map image 741 is an image of a map indicating a current position L of the information processing apparatus 100a and the locations of stores at which the battery of the information processing apparatus 100a can be charged. The battery charge information image 742 is an image indicating the battery charge and the remaining time before shutdown calculated in step S515.

As described above, in the third operation example, in response to the detector CCP_3 detecting a state in which the battery charge has decreased, the activator CCP_4 activates the map App AP_5 associated with the state. In addition, the acquirer CCP_1 acquires the guide image PG, and the display controller CCP_2 causes the display device 14 to display the guide image PG. Then, when the first display state is switched to the second display state, the display controller CCP_2 causes the display device 14 to display a second image generated by execution of the map App AP_5, specifically, a map image indicating the locations of stores at which the battery can be charged.

Effects of First and Second Embodiments

As described above, according to the present embodiments, it is possible to give the user an opportunity to use the information processing apparatuses 100 or 100a in the second display state, and is possible for the user to benefit from the use in the second display state.

Third Embodiment

Figure 18A:
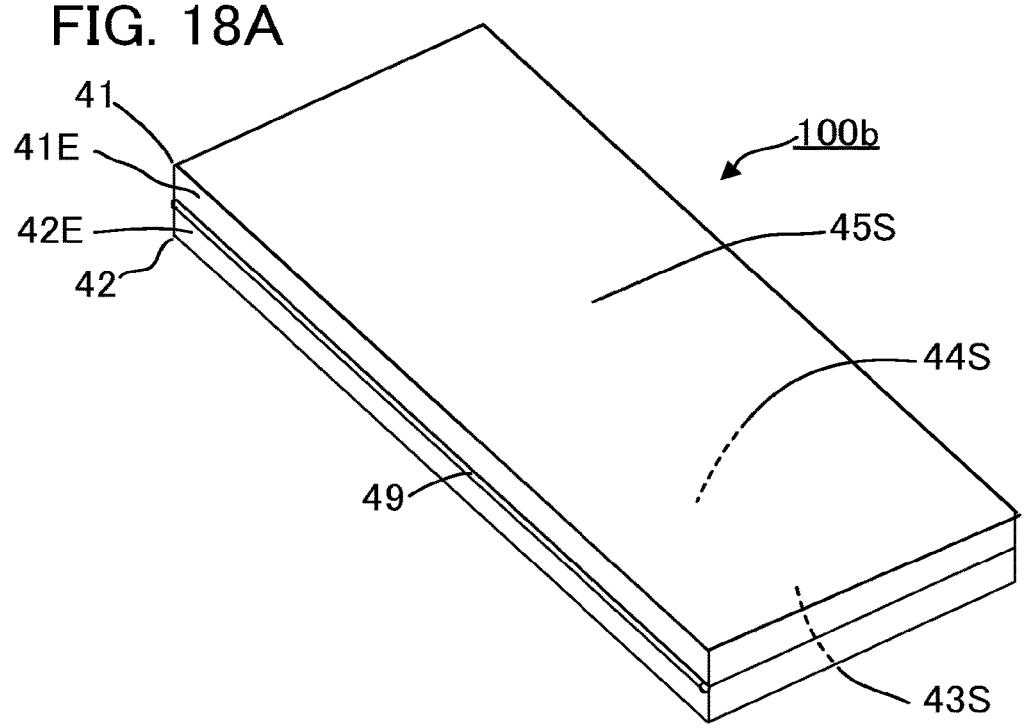
FIG. 18A is a perspective view showing an appearance of an information processing apparatus according to a third embodiment of the present invention in a first display state.
Figure 18B:
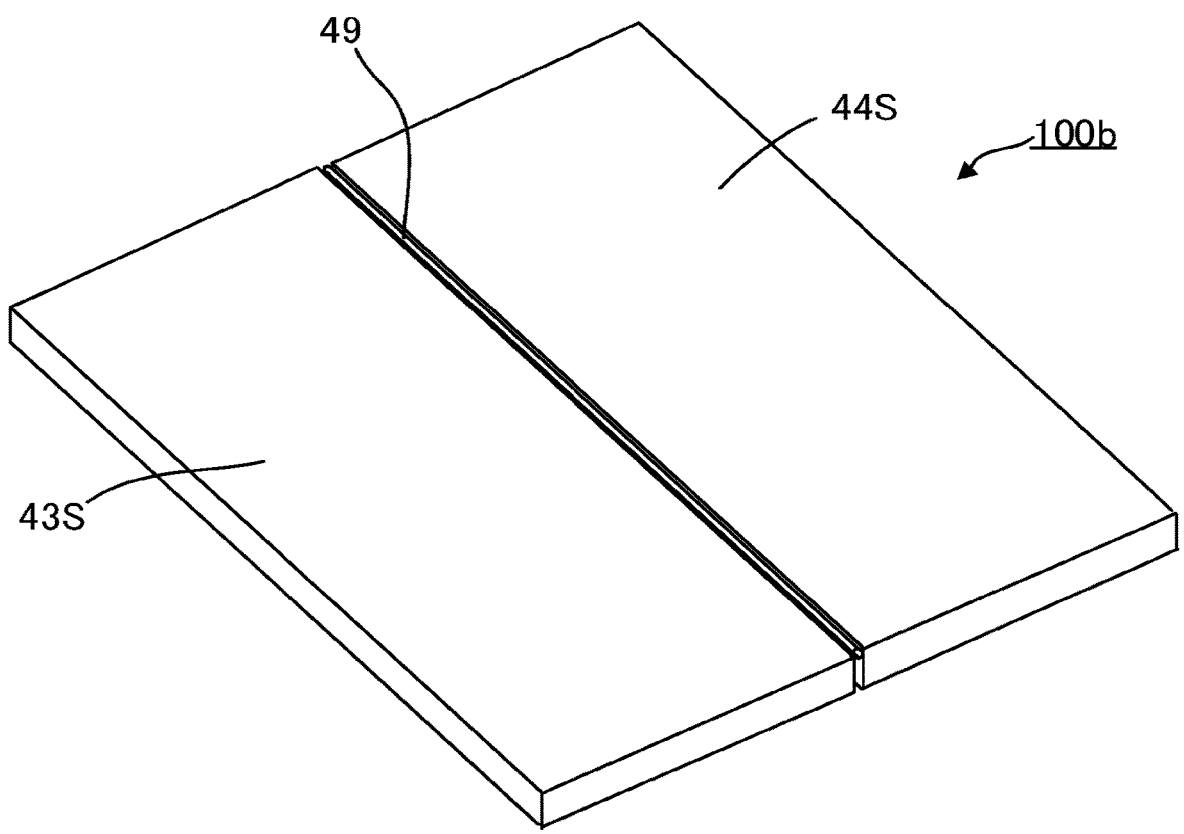
FIG. 18B is a perspective view showing an appearance of the information processing apparatus in a second display state.

FIGS. 18A and 18B are perspective views showing an appearance of an information processing apparatus 100b according to a third embodiment of the present invention. The information processing apparatus 100b in the present embodiment is different from the first and second embodiments in a configuration of a display device 14.

The information processing apparatus 100b includes bodies 41 and 42 and a hinge 49 as in the first and second embodiments. In the first and second embodiments, the information processing apparatuses 100 and 100a each have two display surfaces 41S and 42S. In contrast, the information processing apparatus 100b according to the present embodiment has three display surfaces 43S, 44S, and 45S each having a rectangular shape. Specifically, the body 41 has the display surfaces 45S and 44S on its two front and back faces, respectively, and the body 42 has the display surface 43S on one of its two front and back faces. The hinge 49 connects the long side facing the display surface 43S at a rectangular-shaped end face 41E of the body 41 and the long side facing the display surface 44S at a rectangular-shaped end face 42E of the body 42.

In the present embodiment, as the hinge 49 rotates, a hinge angle formed by the display surfaces 43S and 44S changes. In the present embodiment, by setting the hinge angle to 0 degrees, the user can set the display state of the display device of the information processing apparatus 100a to a first display state in which the display surfaces 43S and 44S face each other to perform display only on the display surface 45S facing outward, as shown in FIG. 18A. In addition, by setting the hinge angle to 180 degrees, the user can set the display state of the display device of the information processing apparatus 100a to a second display state in which the display surface 41S and the display surface 42S face outward to perform display on both the display surface 43S and the display surface 44S, as shown in FIG. 18B. Here, the total display area of the display surfaces 43S and 44S is larger than the display area of the display surface 45S. Therefore, the second display state is a display state having a larger display area than the first display state.

In the present embodiment, a control program and Apps to be executed by a processor 11 are substantially the same as those in the first embodiment or the second embodiment. Therefore, also in the present embodiment, substantially the same effects as those in the first embodiment or the second embodiment can be obtained. In addition, in the present embodiment, the display surfaces 43S and 44S face each other in the first display state, and no user finger or the like touches the display surfaces. Therefore, the present embodiment has an advantage that processing of, for example, invalidating an operation on the touch panels provided on the display surfaces 43S and 44S is unnecessary in the first display state.

Modification Examples

The present invention is not limited to the above embodiments. Specific modification examples are described below. Two or more aspects freely selected from the following examples may be combined.

(1) In each operation example in the first and second embodiments, the image displayed on the display surface 41S is an image different from the image displayed on the display surface 42S. However, the respective images displayed on the display surfaces 41S and 42S may be a part of an image and the other part of the image. For example, during execution of a map application in the first display state, the guide image PG may be displayed on the display surface 41S when a route search to a destination is completed (when the running state enters a predetermined running state), and a large map including the destination may be displayed on the display surfaces 41S and 42S when the display state is switched from the first display state to the second display state. In this case, for example, the image of the west half of the map is the first image, and the image of the east half is the second image. Also in the third embodiment, a part of an image and the other part of the image may be displayed on the display surfaces 43S and 44S.

(2) The running state of an application that triggers the display of the guide image PG can be other than that disclosed in the first embodiment. For example, in the first display state, the processor 11 executes an electronic commerce (EC) application and narrows down items in accordance with instructions from the user. Then, when the running state is detected in which an item to be purchased has been decided on, the display controller CCP_2 displays the guide image PG on the display surface 41S. Then, when the first display state is switched to the second display state, the display controller CCP_2 causes the display device 14 to display a second image generated by execution of the EC application, for example, an image for accepting the purchase of the item. Alternatively, the following operation example is also conceivable. In the first display state, the processor 11 executes a music analysis application and analyzes the title of a piece of music being played near the information processing apparatus 100. Then, when the running state is detected that the title of the music is known, the display controller CCP_2 displays the guide image on the display surface 41S. Then, when the first display state is switched to the second display state, the display controller CCP_2 causes the display device 14 to display the second image indicating a result of the music analysis acquired by execution of the music analysis application.

(3) The state of the information processing apparatus 100a that triggers the display of the guide image PG can be other than that disclosed in the second embodiment. For example, various states, such as the position, posture, acceleration, speed, standing still, walking movement, movement in a vehicle, movement in an aircraft, movement on a ship, and the information processing apparatus 100a entering into a specific area, can trigger the display of the guide image.

(4) In the second operation example in the second embodiment, approach to a stationary device, such as a short-range wireless device installed in a store, triggers the display of the guide image PG. However, not approaching a stationary device, but approaching a moving device may trigger the display of the guide image PG. For example, the processor 11a of the information processing apparatus 100a executes a game application in the first display state. When the information processing apparatus 100a and another information processing apparatus executing the same game App approach within a predetermined distance, the display controller CCP_2 displays the guide image PG on the display surface 41S. In addition, the information processing apparatus 100a exchanges information with the other information processing apparatus. When switching from the first display state to the second display state is detected, the information processing apparatus 100a generates a second image indicating information about the user of the other information processing apparatus acquired in the information exchange, and the display controller CCP_2 causes the display device 14 to display the second image. The information acquired from the other information processing apparatus may include, for example, a simple message, a game ranking, and a nickname.

(5) In the third embodiment, display is performed on the separate display surfaces 43S and 44S in the second display state. However, the information processing apparatus 100b may be provided with one continuous display surface extending over the bodies 41 and 42 and having a larger display area than the display surface 45S to perform display in the second display state on the display surface.

(6) In each of the above embodiments, the smartphone is exemplified as the information processing apparatus 100, 100a, or 100b, but a specific form of the information processing apparatus 100, 100a, or 100b may be freely selected, and it is not limited to the exemplification in each embodiment. For example, a portable or stationary personal computer may be used as the information processing apparatus 100, 100a, or 100b.

(7) In each embodiment described above, the storage device 12 is a recording medium readable by a processor 11, and although ROM and RAM have been shown as examples, it may be constituted by, for example, a flexible disk, a magnetic optical disk (e.g., a compact disc, a digital versatile disc, a Blu-ray (registered trademark) disk, etc.), a smart card, a flash memory device (e.g., a card, a stick, a key drive, etc.), a CD-ROM (Compact Disc-ROM), a register, a removable disk, a hard disk, a floppy (registered trademark) disk, a magnetic stripe, a database, a server, and/or other appropriate storage media. A program may be transmitted via a telecommunication line from a network. A program may be transmitted via a telecommunication line from a communication network. A base station may include an input device such as an input key, an output device such as a display, etc.

(8) The embodiments described herein are applicable to systems using at least one of the systems utilizing long term evolution (LTE), LTE-advanced (LTE-A), SUPER 3G, IMT-Advanced, 4G, 5G, future radio access (FRA), W-CDMA (registered trademark), GSM (registered trademark), CDMA2000, Ultra Mobile Broadband (UMB), IEEE 802.11 (Wi-Fi), IEEE 802.16 (WiMax), IEEE 802.20, Ultra-Wide-Band (UWB), Bluetooth (registered trademark), or any other appropriate systems, and next generation systems extended based thereon.

(9) In each embodiment described above, the information, signals and/or other matters that have been described may be represented by using any of a variety of different technologies. For example, data, instructions, commands, information, signals, bits, symbols and chips, all of which may be referenced throughout the description herein, may be represented by voltages, currents, electromagnetic waves, magnetic fields or particles, optical fields or photons, or any combinations of these. The terms described herein and/or terms necessary for the understanding of this document may be substituted with terms having the same or similar meanings.

(10) In each embodiment described above, the information or the like that are input or output may be stored in a specific place (for example, in a memory) or may be managed using a management table. The information and/or the like that are input and/or output can be overwritten, updated, or added. The information and/or the like that are output may be deleted. The information and/or the like that are input may be transmitted to other apparatuses.

(11) In each embodiment described above, determinations may be made based on values represented by one bit (0 or 1), may be made based on Boolean values ("true" or "false"), or may be made by comparing numerical values (for example, based on comparison with a predetermined value).

(12) The order of processes, etc., in flowcharts in each embodiment described above may be changed. That is, the specific orders illustrated herein are by no means limiting.

(13) The functions exemplarily disclosed in the above embodiments are realized by any combination of hardware or software. Each function may be realized by a single apparatus, or by two or more separate apparatuses.

(14) The program illustrated in each embodiment described above should be broadly interpreted so as to refer to an instruction, an instruction set, a code, a code segment, a program code, a sub program, a software module, an application, a software application, a software package, a routine, a subroutine, an object, an executable file, an executable thread, an execution thread, a procedure, a function or the like, regardless of whether the program is called software, firmware, middleware, microcode, or a hardware description language, or is called something else. Furthermore, the software, the instructions, and the like may be transmitted and received through a transmission medium. For example, when software is transmitted from a website, a server, or another remote source using wired techniques such as using a coaxial cable, an optical fiber cable, or a twisted pair cable, a digital subscriber line (DSL), and/or wireless techniques such as infrared rays, wireless and microwaves, or the like, these wired techniques and/or wireless techniques are included in the definition of transmission media.

(15) In each embodiment described above, there is included a case in which the information processing apparatus 100, the terminal apparatus 100*a*, or 100*b* is a mobile station. A mobile station may be referred to, by one skilled in the art, as a "subscriber station", a "mobile unit", a "subscriber unit", a "wireless unit", a "remote unit", a "mobile device", a "wireless device", a "wireless communication device", a "remote device", a "mobile subscriber station", an "access terminal", a "mobile terminal", a "wireless terminal", a "remote terminal", a "handset", a "user agent", a "mobile client", a "client" or other suitable terms.

(16) In each embodiment described above, the term "connected", and all the other variations of this term mean all direct or indirect connections or coupling between two or more elements, and may include the presence of one or more intermediate elements between two elements that are "connected" or "coupled" with each other. The coupling or connection between these elements may be physical or logical, or may be a combination of these. As used herein, two elements may be considered "connected" or "coupled" to each other by using at least one of one or more electrical wires, cables or printed electrical connections, and as non-limiting and non-inclusive examples, by using electromagnetic energy, such as electromagnetic energy having wavelengths in radio frequency regions, microwave regions and optical (both visible and invisible) regions.

(17) In each embodiment described above, the phrase "based on" does not mean "based only on" unless otherwise specified. In other words, the phrase "based on" means both "based only on" and "based at least on".

(18) In each embodiment described above, the terms "including," "comprising" and modifications thereof are intended to be inclusive like the term "including" as long as they are used in this specification or the claims. Furthermore, the term "or" as used in this specification or claims is not intended to be an exclusive disjunction.

(19) In the present disclosure, in a case in which articles are added in the translation, for example, "a", "an", or "the" in English, these articles include plural forms, unless it is clearly indicated by the context that they do not.

(20) It will be apparent to those skilled in the art that the present invention is not limited by embodiments described in the specification. Accordingly, description of the present specification is for the purpose of illustrative description and does not have any restrictive meaning with respect to the present invention. Consequently, the description herein is provided only for the purpose of explaining examples, and should by no means be construed to limit the present invention in any way. In addition, a plurality of aspects selected from aspects exemplified in the specification may be combined.

DESCRIPTION OF REFERENCE SIGNS

100, 100*a*, 100*b* Information processing apparatus
11, 11*a* Processor
12 Storage device
13 Communication device
14 Display device
15 Input device
16 Positioning device
17 Acceleration detection device
18 Opening and closing detection device
41 42 Body
49 Hinge
41S, 42S, 43S, 44S, 45S Display surface
AP_1 to AP_N Applications
CP, CPa Control program
CCP_1 Acquirer
CCP_2 Display controller
CCP_3 Detector
CCP_4 Activator
OP100, OP100*a* Main processing
OP200 Video reception processing
OP300 Email reception processing
OP400 Schedule display processing
OP500 Store guide processing
OP600 Map processing
OP700 News reception processing
PG Guide image

The invention claimed is:

1. An information processing apparatus comprising:
processing circuitry configured to implement
a display controller configured to control a foldable display device;
an executer configured to execute at least one of a first application program or a second application program; and
an acquirer configured to acquire a guide image, wherein:
display states of the foldable display device include a first display state and a second display state, wherein a display area in the second display state is larger than a display area in the first display state, and wherein the first display state is a foldable state and the second display state is an unfolded state,
the guide image is an image that prompts switching from the first display state to the second display state,
in response to the executer executing the first application program in the first display state, the acquirer is configured to acquire the guide image in accordance with a running state of the first application program, in response to the executer executing the second application program in the first display state, the acquirer is configured to acquire the guide image in accordance with a running state of the second application program, and the display controller is configured to cause the foldable display device to display the guide image in the first display state, wherein:

the executer is configured to execute an electronic commerce application program as the first application program or the second application program, and the display controller is configured to cause the foldable display device to display the guide image when the running state of the electronic commerce application program is detected in which an item to be purchased has been decided on in the first display state.

2. The information processing apparatus according to claim 1, wherein:

the executer is configured to:

generate a first image to be displayed by the foldable display device in the first display state, by executing the first application program when the foldable display device is in the first display state; and in response to the running state of the first application program entering a predetermined state when the foldable display device is in the first display state, generate a second image to be displayed by the foldable display device in the second display state, by executing the first application program, and the display controller is configured to:

cause the foldable display device to display the first image in the first display state; and in response to the first display state switching to the second display state after causing the foldable display device to display the guide image, cause the foldable display device to display the second image.

3. The information processing apparatus according to claim 2, wherein:

the display controller causes the foldable display device to display the second image based on an opening and closing detection device detecting that the display state of the foldable display device is switched from the first display state to the second display state after the guide image is displayed.

4. The information processing apparatus according to claim 1, wherein:

the executer is configured to:

generate a first image to be displayed by the foldable display device in the first display state, by executing the first application program when the foldable display device is in the first display state; and in response to the running state of the second application program entering a predetermined state when the foldable display device is in the first display state, generate a second image to be displayed by the foldable display device in the second display state, by executing the second application program, and the display controller is configured to:

cause the foldable display device to display the first image in the first display state; and in response to the first display state switching to the second display state after causing the foldable display device to display the guide image, cause the foldable display device to display the second image.

5. The information processing apparatus according to claim 4, wherein:

the display controller causes the foldable display device to display the second image based on an opening and closing detection device detecting that the display state of the foldable display device is switched from the first display state to the second display state after the guide image is displayed.

6. The information processing apparatus according to claim 1, wherein:

the executer is configured to execute a music analysis application program as the first application program or the second application program, and the display controller is configured to cause the foldable display device to display the guide image when the running state of the music analysis application program is detected that a title of music is known in the first display state.

7. The information processing apparatus according to claim 1, wherein:

the guide image is not displayed in the second display state.

8. An information processing apparatus with a foldable display device, the information processing apparatus comprising:

processing circuitry configured to implement a detector configured to detect that a state of the information processing apparatus is in a predetermined state;

a display controller configured to control the foldable display device; and an acquirer configured to acquire a guide image, wherein:

display states of the foldable display device include a first display state and a second display state, wherein a display area in the second display state is larger than a display area in the first display state, and wherein the first display state is a foldable state and the second display state is an unfolded state, the guide image is an image that prompts switching from the first display state to the second display state, and the display controller is configured to cause the foldable display device to display the guide image in the first display state based on a result of detection by the detector, wherein:

the information processing apparatus further comprising an executer configured to execute at least one of a first application program or a second application program, the executer is configured to execute an electronic commerce application program as the first application program or the second application program, and the display controller is configured to cause the foldable display device to display the guide image when the running state of the electronic commerce application program is detected in which an item to be purchased has been decided on in the first display state.

9. The information processing apparatus according to claim 8, wherein:

the predetermined state is that in which a moving speed of the information processing apparatus satisfies a predetermined condition, and the display controller is configured to cause the foldable display device to display the guide image in response to the detector detecting that the moving speed has satisfied the predetermined condition when the foldable display device is in the first display state.

10. The information processing apparatus according to claim 9, wherein:

the executer is configured to:

generate a first image to be displayed by the foldable display device in the first display state, by executing the first application program when the foldable display device is in the first display state;

activate, in the first display state, the second application program based on the result of detection by the detector; and generate a second image to be displayed by the foldable display device in the second display state, by executing the activated second application program in the first display state, and the display controller is configured to cause the foldable display device to display the second image in the second display state.

11. The information processing apparatus according to claim 8, wherein:

the predetermined state is that in which the information processing apparatus receives a specific signal, and the display controller is configured to cause the foldable display device to display the guide image in response to the detector detecting that the information processing apparatus has received the specific signal when the foldable display device is in the first display state.

12. The information processing apparatus according to claim 11, wherein:

the executer is configured to:

generate a first image to be displayed by the foldable display device in the first display state, by executing the first application program when the foldable display device is in the first display state;

activate, in the first display state, the second application program based on the result of detection by the detector; and generate a second image to be displayed by the foldable display device in the second display state, by executing the activated second application program in the first display state, and the display controller is configured to cause the foldable display device to display the second image in the second display state.

13. The information processing apparatus according to claim 8, wherein:

the predetermined state is that in which a remaining battery charge of the information processing apparatus is equal to or less than a threshold, and the display controller is configured to cause the foldable display device to display the guide image in response to the detector detecting that the remaining battery charge of the information processing apparatus is equal to or less than the threshold when the foldable display device is in the first display state.

14. The information processing apparatus according to claim 13, wherein:

the executer is configured to:

generate a first image to be displayed by the foldable display device in the first display state, by executing the first application program when the foldable display device is in the first display state;

activate, in the first display state, the second application program based on the result of detection by the detector; and generate a second image to be displayed by the foldable display device in the second display state, by executing the activated second application program in the first display state, and the display controller is configured to cause the foldable display device to display the second image in the second display state.

15. The information processing apparatus according to claim 8, wherein:

the executer is configured to:

generate a first image to be displayed by the foldable display device in the first display state, by executing the first application program when the foldable display device is in the first display state;

activate, in the first display state, the second application program based on the result of detection by the detector; and generate a second image to be displayed by the foldable display device in the second display state, by executing the activated second application program in the first display state, and the display controller is configured to cause the foldable display device to display the second image in the second display state.

16. The information processing apparatus with a foldable display device according to claim 8, wherein:

the guide image is not displayed in the second display state.

* * * * *